(12) United States Patent
Tagawa

(10) Patent No.: US 8,049,721 B2
(45) Date of Patent: Nov. 1, 2011

(54) POINTER LIGHT TRACKING METHOD, PROGRAM, AND RECORDING MEDIUM THEREOF

(75) Inventor: Kinya Tagawa, Tokyo (JP)

(73) Assignee: Lunascape Corporation (JP)

( * ) Notice: Subject to any disclaimer, the term of this patent is extended or adjusted under 35 U.S.C. 154(b) by 964 days.

(21) Appl. No.: 11/816,033

(22) PCT Filed: Feb. 9, 2006

(86) PCT No.: PCT/JP2006/302249
§ 371 (c)(1),
(2), (4) Date: Aug. 10, 2007

(87) PCT Pub. No.: WO2006/085580
PCT Pub. Date: Aug. 17, 2006

(65) Prior Publication Data
US 2009/0021480 A1    Jan. 22, 2009

(30) Foreign Application Priority Data
Feb. 10, 2005   (JP) .................................. 2005-035284

(51) Int. Cl.
*G09G 5/08* (2006.01)

(52) U.S. Cl. .......... 345/158; 345/157; 345/179; 702/95; 178/19.05

(58) Field of Classification Search .................. 345/158, 345/157, 179; 702/145, 95; 178/19.05
See application file for complete search history.

(56) References Cited

U.S. PATENT DOCUMENTS

| 6,275,214 | B1 | 8/2001 | Hansen | |
| 6,292,171 | B1 * | 9/2001 | Fu et al. | 345/156 |
| 6,618,076 | B1 | 9/2003 | Sukthankar et al. | |
| 6,704,000 | B2 * | 3/2004 | Carpenter | 345/158 |
| 2001/0010514 | A1 * | 8/2001 | Ishino | 345/158 |
| 2001/0045940 | A1 * | 11/2001 | Hansen | 345/158 |
| 2002/0089489 | A1 * | 7/2002 | Carpenter | 345/158 |
| 2005/0104849 | A1 | 5/2005 | Hoile | |

FOREIGN PATENT DOCUMENTS

| JP | 11-039095 A | 2/1999 |
| JP | 11085395 A | 3/1999 |

(Continued)

OTHER PUBLICATIONS

Sukthankar et al., Smarter Presentations: Exploiting Nomography in Camera-Projector Systems, Proceedings of International Conference on Computer Vision, 2001, Pittsburgh U.S.
Sukthankar et al., Self-Calibrating Camera-Assisted Presentation Interface, Proceedings of International Conference on Control Automation, Robotics and Vision(ICARCV),2000, Pittsburgh U.S.

(Continued)

*Primary Examiner* — Lun-Yi Lao
*Assistant Examiner* — Olga Merkoulova
(74) *Attorney, Agent, or Firm* — Rossi, Kimms & McDowell LLP

(57) ABSTRACT

A pointer light tracking method wherein all black image and white square images located at four corners of the all black image are projected on the display, the display on which the all black image and the white square images are displayed is shot by a camera, a domain corresponding to the white square image is extracted from the obtained image data, central coordinates (x, y) of the extracted domain are computed, and a parameter necessary in performing distortion correction by use of projection conversion for coordinate expressing the position of the pointer light on the display is computed from the computed central coordinates (x, y) and central coordinates (X, Y) of the white square image.

4 Claims, 22 Drawing Sheets

FOREIGN PATENT DOCUMENTS

| | | |
|---|---|---|
| JP | 2000-276297 A | 10/2000 |
| JP | 2003-504705 A | 2/2003 |
| JP | 2004-265235 A | 9/2004 |
| WO | 01-03106 A1 | 1/2001 |
| WO | 01-47285 A1 | 6/2001 |
| WO | 03-056505 A1 | 7/2003 |

OTHER PUBLICATIONS

Extended search report issued in corresponding European patent application No. 06713392.6-2224/1855184, dated Nov. 7, 2008.

* cited by examiner

POINTER LIGHT TRACKING METHOD, PROGRAM, AND RECORDING MEDIUM THEREOF

This application is a U.S. National Phase Application of PCT International Application PCT/JP2006-302249 filed on Feb. 9, 2006 which is based on and claims priority from JP2005-035284 filed on Feb. 10, 2005 the contents of which is incorporated by reference herein.

TECHNICAL FIELD

The present invention relates to a presentation system such as a projector system in which a computer image is projected from a projector to a projector screen, which is widely used in various kinds of presentations.

BACKGROUND OF THE INVENTION

The projector system is widely used in various scenes such as scholastic societies, lectures, explanation meetings and presentations, and when using the projector system, a user often performs the explanation or the like by pointing a desired portion of a projected image by use of a laser pointer. Various studies and developments on combinations of the projector system with the laser pointer have been made (for example, refer to Patent Documents 1 to 3). Particularly the technology by which a simple line or a figure is drawn on a projected image by a light from the laser pointer (for example, refer to Non-Patent Documents 1, 2) enables drawing of an underline, encircling, arrow, or the like, which further attracts attention of viewers with the drawing overlapped on the image while displaying the image on a projector screen, thus enhancing a presentation effect at various scenes, and further improving a usability value of the projector system.

Patent Document 1: Japanese Patent Laid-Open No. 11-85395
Patent Document 2: Japanese Patent Laid-Open No. 11-39095
Patent Document 3: Japanese Patent Laid-Open No. 2004-265235
Non-Patent Document 1: R. Sukthankar, R. Stockton, M. Mullin., "Smarter Presentation: Exploiting Homography in Camera-Projector Systems," Proceedings of International Conference on Computer Vision, 2001
Non-Patent Document 2: R. Sukthankar, R. Stockton, M. Mullin., "Self-Calibrating Camera-Assisted Presentation Interface," Proceedings of International Conference on Control, Automation, Robotics and Vision, 2000

DISCLOSURE OF THE INVENTION

Problems to be Solved by the Invention

However, it is a present condition that a drawing technique which is good enough in performance to the extent of being capable of achieving the practical use has not yet been realized.

This is because a laser beam from the laser pointer which is displayed on the projector screen with the laser beam overlapped with the projected image from the projector can not be precisely detected to perform tracking of a movement of the laser beam with high accuracy.

It should be noted that various kinds of presentations may use a crystal liquid display, plasma display, or the like of a large size in addition to the projector system, and also in the large size display system it is preferable that the tracking of the laser pointer light with high accuracy is made possible.

Furthermore, it is also preferable that not only the laser pointer but also an LED pointer which can be manufactured more economically is used and the same drawing is made possible by tracking the LED pointer light. Here, the laser beam from the laser pointer and the LED light from the LED pointer are called together as pointer light.

Accordingly, in view of the foregoing problems, an object of the present invention is to provide a pointer light tracking method, a pointer light tracking program, and a recording medium thereof which can realize tracking of the pointer light which is projected on various displays such as a projector screen or the like with high precision even when an image is displayed on the display, whereby anyone is able to draw lines, figures or the like simply and finely on the display, and furthermore, various kinds of applications which improve the usability other than the drawing are also made realizable.

Means for Solving the Problem

In order to solve the above-described problem, a first aspect of the present invention provides a pointer light tracking method for shooting pointer light projected on a display by a camera to track the pointer light on the display by a computer based on an image data obtained, wherein an all black image and white square images located at four corners of the all black image are made to be projected on the display, a display where the all black image and the white square images are displayed is shot, a domain corresponding to the white square image is extracted from the obtained data, a central coordinate (x, y) of the extracted domain is computed, and a parameter which is needed at the time of performing distortion correction by use of projection conversion for a coordinate expressing a position of the pointer light on the display is computed from the computed central coordinate (x, y) and the central coordinate (X, Y) of the white square image.

A second aspect of the present invention provides a pointer light tracking method for shooting pointer light projected on a display by a camera to track the pointer light on the display by a computer based on an image data obtained, wherein any one, or two or more of a shutter speed, an exposure, or a gamma value of the camera which shoots a display where the pointer light is displayed is adjusted to obtain an image data in which only the pointer light is strongly displayed.

A third aspect of the present invention provides a pointer light tracking method for shooting pointer light projected on a display by a camera to track the pointer light on the display by a computer based on an image data obtained, wherein the image data is subjected to gradation processing for enlarging a domain of a light spot of the pointer light contained in the image data.

Further, a fourth aspect of the present invention provides a pointer light tracking program which includes a computer having a function for tracking pointer light on a display based on an image data obtained by shooting by a camera the pointer light projected on the display, the function comprising means for shooting by the camera a display where an all black image and white square images located at four corners of the all black image are displayed to extract a domain corresponding to the white square image from an image data obtained, means for computing a central coordinate (x, y) of the extracted domain, and means for computing a parameter which is needed at the time when distortion correction is performed by use of projection conversion for a coordinate expressing a position of the pointer light on the display from the computed central coordinate (x, y) and the central coordinate (X, Y) of the white square image.

A fifth aspect of the present invention provides a pointer light tracking program which includes a computer having a function for tracking pointer light on a display based on an image data obtained by shooting by a camera the pointer light projected on the display, the function comprising means for adjusting any one, or two or more of a shutter speed, an exposure, and a gamma value of the camera which shoots a display where the pointer light is displayed so that the image data in which only the pointer light is strongly displayed is obtained.

A sixth aspect of the present invention provides a pointer light tracking program which includes a computer having a function for tracking pointer light on a display based on an image data obtained by shooting by a camera the pointer light projected on the display, the function comprising means for performing gradation processing for the image data so that a domain of a light spot of the pointer light contained in the image data is enlarged.

A seventh aspect of the present invention provides a computer-readable recording medium for recording the pointer light tracking program.

Advantage of the Invention

According to the first to third aspects of the invention described above, pointer light projected on various kinds of displays used in presentation such as a projector screen, or a large-size crystal liquid display can be accurately detected for tracking, and even when an image is displayed on the display, this highly accurate tracking can be realized.

In particular, in the first aspect of the invention, considering distortion of the image usually generated by the projector projection, extremely effective distortion correction is made possible by use of the parameter obtained as described above, and thereby a two-dimensional coordinate value of the pointer light spot contained in the image data obtained by the shooting by a camera can be computed more exactly. It goes without saying that there is a case where the image distortion is generated in projected images of various kinds of displays other than the projector projection, and in such case the distortion correction can be made to be a preferable one in the same way and high accuracy tracking can be realized.

Further, in the second aspect of the invention, when a display where usually the light from the projector and the pointer light from the laser pointer or LED pointer are displayed is shot by a camera, there tends to occur a situation where the pointer light is buried in the projector light, and it becomes difficult to extract the buried pointer light by the computer image processing. However, by adjusting any one, or two or more of the shutter speed, exposure, and gamma value of the camera to the optimum as described above, the projector light is blocked and the camera image data in which only the pointer light is strongly displayed can be obtained, and thereby the pointer light spot can be accurately extracted. It goes without saying that by combining the optimization adjustment and the correction coordinate computation described above, the more excellent pointer light tracking can be realized. Further, the optimization adjustment is also effective in a case of using various kinds of displays other than the projector screen, and can block the extra light in the same way to make the high accuracy extraction of the pointer light spot.

Further, in the third aspect of the invention, the light spot of the pointer light is very small as compared to a magnitude of the entirety of the display, and even if the shutter speed adjustment is performed to obtain the image data in which the pointer light spot is emphasized is obtained, the size of the light spot itself remains to be small. Therefore, the gradation processing as described above is performed to enlarge the size of the light spot, and the pointer light spot can be extracted more accurately without being buried in surrounding images. It goes without saying that by combining the gradation processing with the correction coordinate computation or the optimization adjustment, the pointer light tracking with further higher accuracy can be realized.

Then, according to the fourth to seventh aspects of the present invention, there are provided a computer program which brings about the same effects as the first to third aspects of the present invention, and a recording medium such as a flexible disc, a CD, or a DVD, which has recorded the computer program.

BEST MODE OF CARRYING OUT THE INVENTION

FIG. 1 shows an embodiment of the present invention having characteristics as described above. Here, description is made mainly of a projector system mode which is widely adopted for the presentation.

<<1. System Construction>>

A projector system according to the present embodiment comprises a projector screen 1, a projector 2, a computer 3, a laser pointer 4, and a camera 5.

The projector screen 1 is capable of displaying an image projected from the projector 2, and it may be, for example, not only a screen body arranged on a wall or the like but also a wall plane itself where display of the image is possible.

The projector 2 is a device capable of projecting an image transmitted from the computer 3 on the projector screen 1, and is provided with a projecting unit which projects light for displaying the image, a communication unit which transmits and receives a data signal or a control signal to and from the computer 3, and the like.

The Computer 3 transmits an image of a projection target (an image to be projected) to the projector 2, and performs laser beam tracking processing according to the present invention and various kinds of application processing of drawings and the like based on the tracking. The processing is performed by a central processing unit (CPU) 31 which receives instructions of a laser beam tracking program and an application program stored in a memory unit (memory) 32. The CPU 31 is also connected with, besides the memory unit 32, a data file unit 33 which stores various kinds of data, a display unit 34 such as a display for displaying a program performing picture plane or various kinds of data, an input unit 35 such as a keyboard or a mouse, a projector communication unit 36 for transmitting and receiving the data signal or the control signal to and from the projector 2, and a camera communication unit 37 for transmitting and receiving the data signal or the control signal to and from the camera 5, by a bus 38.

The image transmitted from the computer 32 to the projector 2 is usually a desk-top picture plane (an image on a display screen) displayed on the display, and for example, a presentation image produced by use of a presentation software is firstly displayed on the desk-top picture plane (usually, entire picture plane display), the desk-top picture plane is transmitted to the projector 2 to be projected on the projector screen 1, and thereby the presentation image appearing on the desk-top picture plane is displayed on the projector screen 1.

The laser pointer 4 is a device capable of projecting the laser beam and is provided with a projection unit for projecting the laser beam, a member held by a hand of a user, and the like. Since the laser beam can not only point a desired portion in the projected image, but also draw a picture on the image, it may be called a laser pen.

The camera 5 is a device which can shoot (take a picture of) the projector screen 1 where the image from the projector 2 and the laser beam from the laser pointer 4 are displayed, and input the shot data into the computer 3. In case of a digital camera, it is provided with an image sensor such as CCD (charge coupled device), a communication unit for transmitting and receiving the data signal and the control signal to and from the computer 3, and the like. It goes without saying that it may not be the digital camera.

As for the projector screen 1, the projector 2, the computer 3, the laser pointer 4, and the camera 5, those commercially available may be used, and up to setting of the projector screen 1, the projector 2, and the computer 3, the system is the same as conventional. In addition thereto, the camera 5 is arranged at a location of enabling the shooting of the projector screen 1, and is connected to the computer 3 in such a manner as to enable data-communication. The computer 3 is provided with the laser beam tracking program and the application program installed therein. It goes without saying that software may be made by combining these programs into one. Thereafter, a user such as a presenter is to have the laser pointer 4.

<<2. Laser Beam Tracking>>

Hereunder, description is made of the laser beam tracking processing in the projector system prepared as above described, suitably referring to FIGS. 2 to 12.

An entire construction of the laser beam tracking program according to the present embodiment is made as shown in FIG. 2, and a distortion correction parameter obtaining program as shown in FIG. 3, a camera control program as shown in FIG. 6, a light spot detecting program as shown in FIG. 9, and a distortion correction program as shown in FIG. 11 are mutually related and incorporated. Although a camera image data obtaining program as shown in FIG. 7 and a camera image data input program as shown in FIG. 8 are also incorporated, they are not shown in FIG. 2. An application program, which is described later in detail, performs various kinds of application functions such as picture drawing which improves usability based on a result of processing by the laser beam tracking program, in other words, the coordinate data of the tracking laser beam.

<2-1. Obtaining Distortion Correction Parameter>

Firstly there is performed the processing for obtaining a parameter for the distortion correction necessary in exact tracking (refer to FIG. 3.) The distortion correction parameter is a parameter necessary in matrix computation of the projection conversion performed in the distortion correction processing, which will be described later.

The processing is an initial setting processing which is performed only once when the laser beam tracking program is activated, and is performed by the distortion correction parameter obtaining program incorporated in the laser beam tracking program (refer to FIG. 2.) It goes without saying that, in such a circumstance where a value of the distortion correction parameter is largely fluctuated to the extent unallowable in performing the tracking processing, for example, by shifting of the position of the projector 2 or camera 5, repetition of the performing is necessary.

<Step S2-1-1>

Firstly (to start with), an all black image is displayed on the projector screen 1.

More specially, the all black image is in advance produced by and stored in the computer 3, which is then transmitted from the computer 3 to the projector 2 to be projected on the projector screen 1 from the projector 2. More plainly, if the produced all black image is displayed on the desk-top picture plane on the display, it is to be projected on the projector screen 1 via the projector 2.

<Step S2-1-2>

Then, at four corners of the all black image, an image of white small square is sequentially displayed (refer to FIG. 4.)

More specially, the four white small square images located at four corners of the all black image are in advance produced by and stored in the computer 3, and they are transmitted from the computer 3 to the projector 2 to be projected on the projector screen 1 from the projector 2. Also in this case, more plainly, when the produced four white square images are displayed at the four corners of the desk-top picture plane on the display so as to be overlapped with the all black image, they are to be projected on the projector screen 1 via the projector 2.

<Step S2-1-3>

Respective central coordinates of these four white square images are stored as (X1, Y1), (X2, Y2), (X3, Y3), and (X4, Y4) (refer to FIG. 4.)

More specially, at a stage where the four white square image data is produced by the computer 3, respective central coordinates in the X axis/Y axis coordinate system set on the all black image are in advance computed by and stored in the computer 3. An example of the coordinate system may include a screen coordinate system usually set on the display or the desk-top picture plane, and the central coordinates of the white square images at the four corners in the screen coordinate system may be obtained.

<Step S2-1-4>

Then, the all black image and the white square images displayed on the projector screen 1 are shot by the camera 5.

More specially, the camera 5 starts with the shooting of the projector screen 1 in accordance with a control signal instructing the start of the shooting from the computer 3.

It goes without saying that the computer 3 may not be synchronized with the camera 5, and the system construction may be made such that the shooting by the camera 5 may be manually started.

<Step S2-1-5>

Domains (areas) corresponding to the four white square images are extracted from the shot image data.

More specially, since the all black image and the white square images appear in the camera image data shot by the camera 5 and taken into the computer 3, if only the white domains are extracted from the camera image data by the image processing, four domains corresponding to the four white square images can be obtained.

<Step S2-1-6>

Further, respective central coordinates of these four domains are computed and stored as (x1, y1), (x2, y2), (x3, y3), and (x4, y4.)

More specially, the central coordinates of the respective domains in the X-axis/Y-axis coordinate system are computed and stored by and in the computer 3.

<Step S2-1-7>

Then, simultaneous equations of the central coordinates (X1, Y1), (X2, Y2), (X3, Y3) and (X4, Y4) and the central coordinates (x1, y1), (x2, y2), (x3, y3), and (x4, y4) are solved to compute eight parameters necessary for the matrix computation of the projection conversion.

Generally in the projector projection, when the image displayed on the display of the computer 3 is compared with the image projected on the projector screen 1 from the projector 2, a distortion is often generated in the projected image. When the tracking processing continues to be performed without paying consideration to the distortion, an influence of the distortion is similarly caused in the coordinate value of the laser beam to be finally obtained, and further the drawing processing or the like based on the coordinate value cannot be accurately performed.

Therefore, the present invention is designed to perform the distortion correction such that the higher accuracy tracking is realized and the application such as the picture drawing processing based thereon can be made to be more preferable one.

Since the distortion correction is performed by two-dimensional projection conversion in which the camera image data obtained by shooting the image after the projection by the camera 5 is fit in an original image data prior to the projection, the eight parameters necessary for the matrix computation of the projection conversion are computed here to obtain a projection conversion expression.

For computing the parameters, an eighth-degree simultaneous equation of the central coordinates (X1, Y1), (X2, Y2), (X3, Y3), and (X4, Y4) of the original image data of the white square with the central coordinates (x1, y1), (x2, y2), (x3, y3), and (x4, y4) of the camera image data is solved.

In other words, as illustrated in FIG. 5, a shift between the central coordinate (X, Y) of the white square image prior to the projection and the central coordinate (x, y) of the white square image after the projection is the distortion, and by performing the distortion correction by the two-dimensional projection conversion expression by use of the eight parameters representing the degree of the distortion, the tracking of taking the distortion into consideration is realized. An expression in FIG. 5 is an example of the two-dimensional projection conversion expression. Since a numerator and a denominator of the expression can be reduced by a scaler, the number of the independent parameters is eight.

<2-2. Adjustment of Camera Shutter Speed, Exposure, and Gamma Value>

After the distortion correction parameter obtaining processing is performed, the presentation image is actually displayed on the projector screen 1 from the projector 2, and a user starts with the presentation by suitable use of the laser pointer 4 (hereinafter, description is made of the use at the presentation as an example, for simplification of the description). However, before proceeding to the stage, in order to realize more preferable tracking, the processing of adjusting the shutter speed, the exposure, and the gamma value of the camera 5 is performed such that the image data in which the light from the projector is blocked and only the laser beam from the laser pointer 4 is strongly displayed can be obtained by the camera 5 (refer to FIG. 6.).

In the present invention, the tracking of the laser beam displayed on the projector screen 1 is performed by shooting the laser beam on the projector screen 1 by the camera 5 as described later in detail, extracting the domain corresponding to the light spot from the camera image data obtained, and repeating the processing of computing the coordinate of the domain matching with the shooting speed of the camera 5 (the obtained coordinate value is used in picture drawing processing or the like). In order to improve the accuracy of the domain extraction of the light spot at this point, it is necessary that the laser beam is accurately caught by the camera 5. Therefore, it is an extremely important processing that the projector light is blocked as much as possible by adjusting the shutter speed of the camera 5 such that only the laser beam can be shot. It should be noted that this processing is performed by a camera control program incorporated in the laser beam tracking program (refer to FIG. 2.)

<Step S2-2-1>

To start with, an arbitrary shutter speed value, exposure, and gamma value are transmitted from the computer 3 to the camera 5.

More specially, when the initial value of the shutter speed is inputted into the computer 3 by a user, it is transmitted from the computer 3 to the camera 5. Or, the initial value in advance set and stored is transmitted from the computer 3 to the camera 5.

<Step 2-2-2>

In the camera 5, the shutter is released with the shutter speed value, the exposure, and the gamma value transmitted, to shoot the presentation image and the laser beam on the projector screen 1. It may also be said that the projector screen 1 where the presentation image and the laser beam are displayed is shot.

<Step S2-2-3>

The camera image data obtained by the shooting (hereinafter, simply referred to as "image data" for simplification of the description) is transmitted to the computer 3, and the computer 3 determines whether the laser beam is sufficiently strongly displayed in the image data.

More specially, for example, data of color information representing the laser beam (RGB value, luminance value, or the like) is in advance set, and the determination is made whether only the data corresponding thereto is contained in the image data.

<Step S2-2-3 No, S2-2-4>

When it is determined that the display of the laser beam is not sufficient, reversely speaking, when it is determined that the blocking of the projector light is not sufficient, the initial value is adjusted to set a new shutter speed value, exposure, and gamma value.

<Step S2-2-3 Yes, S2-2-5>

Hereinafter, the above-described respective steps are repeated until the determination of Yes is obtained, in other words, until the light spot can be determined, thereby optimizing the shutter speed, the exposure, and the gamma value. The determination of Yes shows a case where there is one or more image of the light spot and the image is of the size worthy of the laser beam. The determination of the size is performed based on whether the above-described previously set RGB value or the like continuously exists in the previously set number of pixels. It goes without saying that a determination method other than the described above may also be applied.

Consequently, the light from the projector 2 is blocked in a hardware way by the camera 5, and only the light from the laser pointer 4 can be selectively caught. Since the projector light is blocked, in the obtained image data, only the laser beam strongly appears brightly shining in a dark background.

A concrete value of the shutter speed depends also on the performance of the camera and the surrounding environment and it is preferable that, for example, the shutter speed ranges from 150 to 300/sec.

For the optimization adjustment, all of the three of the shutter speed, exposure, and gamma value are not required as the adjustment target, and any one of them, or a combination of two or more of them may be adaptable. However, depending on the use environment, the adjustment of the shutter speed is considered to be most effective. Therefore, in combination, preferably the shutter speed is necessarily contained and the exposure or the gamma value is added thereto, thus enabling an improvement on stability of the good laser beam extraction. In each processing at the time of combining, an arbitrary combination is automatically selected to start with, shooting is made with the initial values of the combined parameters (S2-2-2). When the light spot is lost, the adjustment is performed of the combining method together with respective parameter values from the surroundings of the combination at this point, and the adjustment is repeated until the light spot can be identified (S2-2-3, No, S2-2-4). Then, when the light spot is identified, the respective parameters are set to the optimum values (S2-2-3 Yes, S2-2-5).

<2-3. Obtaining Camera Image Data>

In continuation, description is made of processing for obtaining the image data by the camera 5 of which the shutter speed or the like is optimized as described above (refer to FIG. 7). This processing is performed by the camera image data obtaining program incorporated in the laser beam tracking program.

<Step S2-3-1>

To start with, an image data in which the laser beam is emphasized as described above is obtained by the camera 5.

More specially, the camera 5 shoots the projector screen 1 where the presentation image and the laser beam are displayed, and since the shutter speed of the camera 5 is optimized as described above, only the laser beam results in emphatically appearing in the shot image. Accordingly, when the shooting is performed by an image sensor such as CCD in the case of the digital camera, color information of the image in which the laser beam is emphasized as described above can be obtained.

<Step S2-3-2>

Then, the color information is transferred from the camera 5 to the computer 3 as the image data.

The above-described camera image data obtaining processing is repeated at a shooting rate of 30 frames per second. Further, an image size thereof is, for example, 320 pixels×240 pixels.

<2-4. Input of Camera Image Data>

In continuation, description is made of processing for inputting the image data transferred as described above into the computer 3 (refer to FIG. 8). This processing is performed by the camera image data inputting program incorporated in the laser beam tracking program <Step S2-4-1>

To start with, the image data transmitted from the camera 5 is received by a camera communication unit 37 provided by the computer 3. Transmitting and receiving between the camera 5 and the computer 3 may be made in a wired way or wireless way.

<Step S2-4-2>

In continuation, the image data received is stored in a memory unit 32 or in a data file 33, provided by the computer 3, and thereby the image data is taken into the computer 3.

<2-5. Light Spot Detection>

In continuation, description is made of processing for detecting a light spot from the image data taken in as described above by the computer 3 (refer to FIG. 9). This processing is performed by a light spot detecting program incorporated in the laser beam tracking program (refer to FIG. 2).

<Step S2-5-1>

To start with, the image data taken in is subjected to gradation processing.

More specially, the gradation processing is performed on the entirety of the image data in such a manner as to enlarge a domain of the light spot in the image data (refer to FIGS. 10(A), 10(B)). For this gradation processing, averaging, gauss gradation, or the like which is generally known in the field of image processing may be used.

Consequently, the light spot can be prevented from being buried in the image data to be undetectable, and probability of losing the light spot is remarkably reduced. Accordingly, the tracking of the light spot, namely the tracking of the light spot by the computer 3 by shooting the laser beam from the laser point 4 displayed on the projector screen 1 by the camera 5 can be realized with higher accuracy (refer to FIG. 12(A)).

<Step S2-5-2>

The image data to which the above-described gradation processing is performed is subjected to domain extracting processing.

More specially, in order that a domain corresponding to the light spot enlarged as described above in the image data is detected, a domain having a value more than a predetermined threshold value in the color information of the pixel unit constituting the image data is extracted (refer to FIG. 10(C)). The threshold value is in advance set to a color information value (RGB value or luminance value) in accordance with the light spot.

<Step S2-5-3>

Then, a coordinate of the gravity of the extracted domain (input X, input Y) is computed (refer to FIG. 10(C)). For the computing processing of the gravity coordinate, a computing method generally known in the image processing field may be used.

<2-6. Distortion Correction>

In continuation, description is made of distortion correction processing for the gravity coordinate computed as described above by the computer 3 (refer to FIG. 11). This processing is performed by a distortion correction program incorporated in the laser beam tracking program (refer to FIG. 2).

<Step S2-6-1>

To start with, the gravity coordinate (input X, input Y) is subjected to the projection conversion.

More specially, the gravity coordinate (input X, input Y) is subjected to the projection conversion by a projection conversion expression by use of the eight parameters obtained by the above-described distortion correction parameter obtaining processing.

Thereby, the gravity coordinate of which the distortion generated by the projector projection as described above (refer to FIG. 5) is corrected (AG Point X, AG Point Y) can be obtained.

<Step S2-6-2>

Hereinafter, the corrected gravity coordinate (AG Point X, AG Point Y) is stored in the computer 3.

<2.7 Loop Processing>

It should be noted that the respective processing of 2.1 to 2.6 constituting the above-described picture drawing processing is repeatedly performed for the image inputted from the camera 5 to the computer 3 at a rate of 30 frames per second.

Consequently, the laser beam from the laser pointer 4 displayed on the projector screen 1 is accurately detected by the computer 3 and the camera 5, thus enabling the tracking of the movement thereof (refer to FIG. 12(A)).

Hereinafter, if, for example, a picture drawing data corresponding to the gravity coordinate of the laser beam subjected to the tracking is automatically produced by the computer 3, and the picture drawing data is projected on the projector screen 1 together with the presentation image from the projector 2, lines, circles, or the like in accordance with the movement of the laser beam are displayed on the projector screen 1, as illustrated in FIG. 12(B), and the picture drawing on the projector screen 1 by the laser pointer 4 is realized.

<<3. Application>>

Incidentally, the projector system according to the present embodiment which has the realized high accuracy tracking of the laser beam on the projector screen 1 as described above can realize not only the picture drawing by the laser pointer 4 but also various functions which further improve the usability. In particular, the projector system performs respective application programs as necessary based on the above-described coordinate data (AG Point X, AG Point Y), while tracking the laser beam on the projector screen 1 by the respective processing of the above-described 2.1 to 2.6.

Hereinafter, description is made of various kinds of functions by the respective application programs, suitably referring to FIGS. 13 to 22.

The entire construction of the application program in the present embodiment is as shown in FIG. 13, and a track record program as shown in FIG. 14, a track reproduction program as shown in FIG. 15, a function switching program as shown in FIG. 16, a pen-picture drawing program as shown in FIG. 17, a mouse emulation program as shown in FIG. 19, a presentation software control program as shown in FIG. 21, and a semi-transparent display program are mutually related and incorporated therein. It goes without saying that all these programs can be put together into software, and the laser beam tracking program can also be put together into one software, which can be installed in the computer 3.

FIG. 22 shows an example of a menu picture plane to be displayed on the desk-top picture plane when the software containing all the programs put together is installed in the computer 3 and activated. Icons indicating various functions to be performed by respective programs are displayed, the menu picture plane is projected from the projector 2 onto the projector screen 1, and only by projecting the laser beam from the laser pointer 4 to an arbitrary icon on the projection menu picture plane, an icon operation can be simply performed, and thus the usability is remarkably improved.

<3.1 Track Record>

To start with, description is made of the track record (refer to FIG. 14).

<Step S3-1-1>

To start with, the coordinate data (AG Point X, AG Point Y) is delivered from the distortion correction program to the track recording program.

<Step S3-1-2>

Then, the coordinate data and time t are set into one set (AG Point X, AG Point Y), which will be sequentially recorded.

As the time t, for example, the time when the delivery described above is performed, the time when the coordinate data is computed, or the like may be considered for setting. Further, a point of the time when the recording is started is set to zero (0).

As a result, the recording is made for indicating at which time point the respective coordinate data is made, in other words the timing when the laser beam is projected to the respective positions indicated by the respective coordinate data is recorded. Accordingly, it may be said that the coordinate track data represents the projection track of the laser beam on the projector screen 1, and further it may be said that the operational track of each icon operation, each picture drawing operation, or the like by the laser beam on the menu picture plane of the projector screen 1 is represented.

<3.2 Track Reproduction>

In continuation, description is made of the track reproduction (refer to FIG. 15).

<Step S3-2-1>

To start with, an output of raw data from the track recording program is stopped.

<Step S3-1-2>

Then, the coordinate track data is outputted as dummy data in accordance with exact time t recorded.

Since the application is operated without distinguishing whether it is normal data or dummy data, the operation by the laser beam of the user on the menu picture plane of the projector screen 1 can be exactly reproduced on time by the output of the dummy data.

At this time, if the dummy data is continuously outputted at high speed, neglecting recording time t of the dummy data, "head-out" of the operation is made possible.

<3.3 Function Switching>

In continuation, description is made of function switching (refer to FIG. 16).

The function switching is processing for selecting an icon on the menu picture plane which is displayed on the projector screen 1 with use of the laser beam by a user to switch to a function allocated to the icon.

<Step S3-3-1>

More specially, to start with, a selection domain of each icon is in advance defined and the domain coordinate data is stored.

<Step S3-3-2>

The coordinate track data (AG Point X, AG Point Y, t) is received from the track recording program.

<Step S3-3-3>

Then, determination is made as to whether the laser beam is in the selection domain of any of the icons based on the coordinate track data (AG Point X, AG Point Y, t). The coordinate data and the respective domain coordinate data are compared.

<<Step S3-3-4>>

When there exists an icon in which the laser beam is, determination is made as to whether the laser beam has been in the selection domain of the icon for more than a predetermined time period. Computation is made as to how long the time data t of the coordinate track data which is in the same icon selection domain has lasted.

<<Step S3-3-5>>

Then, if it is found to be in the selection domain for more than the predetermined time, it is determined that the icon is selected, and the function allocated to the icon is activated.

As a result, a user can select the icon only by applying the laser beam onto a desired icon out of a group of icons on the menu picture plane for a certain period of time, and can activate the function allocated to the icon.

<3.4 Pen-Picture Drawing>

In continuation, description is made of pen-picture drawing (refer to FIG. 17).

This function is a function to draw a picture on the projector screen 1 by the laser pointer 4. Since the laser pointer 4 performs a function like a pen, it is referred to as a pen-picture drawing function.

<Step S3-4-1, S3-4-2>

To start with, the coordinate track data (AG Point X, AG Point Y, t) are sequentially received from the track recording program to produce bit map data which connects from a position on the desk-top picture plane corresponding to the initial coordinate data to a position corresponding to the following coordinate data.

By sequentially repeating this operation about each coordinate data, drawing of a picture in which the respective coordinate data are connected in the sequence of time t is performed (refer to FIG. 18(A)).

<Step S3-4-3>

However, since the coordinate data are discrete, if the picture drawing is performed by connecting them as they are with straight lines, there is produced only an unnatural line which is bent at each of the positions corresponding to the coordinate data.

Therefore, in the present invention, interpolation processing by Bezier curve is performed to the discrete data, thus enabling the picture drawing of more natural and smooth curve.

More specially, to start with, coordinates of two control points necessary in the picture drawing of the Bezier curve are computed from the coordinate values of four points to produce a curve. By performing processing such that neighboring curves are connected each other to form tangential continuation, a smooth-continuous curve can be obtained (refer to FIG. 18(B)).

<Step S3-4-4>

Furthermore, in the present invention, as an expansion of the interpolation function, picture drawing of the feeling like a brush pen can also be performed.

More specially, to start with, a control point of the curve is offset toward the direction perpendicular to the curve to produce a new curve. An offset quantity at that time is determined so as to be in inverse proportion to the moving speed of the light spot. If the number of the offset curve is increased to a plurality (for example, more or less 30 pieces), the picture drawing with the feeling as if written by the brush pen can be performed (refer to FIG. 18(C)).

<Mouse Emulation>

In continuation, description is made of mouse emulation (refer to FIG. 19).

This function is to realize a function equivalent to the normal mouse function by the laser beam on the projector screen 1.

<Step S3-5-1>

To start with, by function switching by the laser beam as described above, the mouse emulation function is selected.

More specially, by retaining the laser beam in the domain of the mouse icon expressing a mouse emulation function on the menu picture plane for a certain period of time, the mouse emulation function is selected.

<Step S3-5-2>

When the mouse emulation function is selected, icons showing various kinds of mouse functions such as "mouse movement," "single click," "double click," "right click," or "drag," as illustrated in FIG. 20 are displayed.

<Step S3-5-3>

Hereinafter, by retaining the laser beam for a certain period of time in the domain of the icon expressing a desired mouse function, the icon is selected, and as a result, the allocated mouse function is made to be performed.

For example, if the single click icon is selected, the single click can be performed by the laser beam while keeping on directing the laser pointer 5 toward the projector screen 1. These mouse functions are synchronized with the functions of the presentation software or the software of the present invention, and if the single click is clicked, a function of the software corresponding to the single click is made to be performed.

<3.6 Software Control>

In continuation, description is made of a software control (refer to FIG. 21).

This function is to issue commands to various kinds of software such as the presentation software by the laser beam on the projector screen 1 for performing functions held by the various kinds of software, for example, "page turning over," "page turning back," "head-out," "display in a list," or the like for realizing the control of the software.

<Step S3-6-1>

To start with, the software control function is selected by the function switching by the laser beam as described above.

More specially, the laser beam is forced to retain for a certain period of time in the icon domain expressing the software control function on the menu picture plane to have the software control function selected.

<Step S3-6-2>

When the software control function is selected, icons showing various kinds of software functions such as "page turning over," "page turning back," "head-out," and "display in a list," as illustrated in FIG. 22 are displayed.

<Step S3-6-3>

Hereinafter, by retaining the laser beam in a domain of the icon expressing a desired software function for a certain period of time, the icon is selected, and a command signal for performing the allocated software function can be made to be transmitted to the software in the computer 3.

For example, in case of the presentation software, if "page turn over" icon is selected, it can be advanced to the next presentation page.

<3.7 Semi-Transparent Display>

Finally, description is made of a semi-transparent display.

This function is optional in the picture drawing functions, and is to arrange the bit map data produced as described above on the front-most plane of the desk-top picture plane and display it in a semi-transparent way.

As a result, a user can obtain the feeling as if he is directly writing hand-writing letters on the application operated by himself or herself, thus enabling a further improvement on the usability.

<<4. Others>>

<4.1 Laser Pointer>

The present invention as described above uses a laser pointer 5 which is capable of emitting the laser beam in two colors or three or more colors (for example, red and green), and processes the light spot domain extraction by the light spot detection program by use of a plurality of kinds of threshold values in advance set corresponding to the respective colors, and thus the laser beams of the respective colors can be distinguished for recognizing. Thereby the high accuracy tracking as described above can be realized for each laser beam, and the application processing such as the picture drawing processing based thereon can also be realized.

<4.2 Led Pointer>

Further, the present invention may be also applied to tracking of LED light from an LED pointer, in addition to the laser pointer 5. The LED pointer is, for example, formed to be pen-shaped or directing-stick-shaped provided with the LED on the tip end thereof, and emits LED light in red, green, or the like in the same way as the laser beam. It goes without saying that the LED pointer capable of emitting two colors, or three or more colors can also be adopted.

What is specifically mentioned is that, according to the present invention, whether it is the laser beam from the laser pointer 5 or the LED light from the LED pointer, high accuracy tracking and high usability can be possible by the equivalent system construction, tracking processing, and application processing as described above.

<4.3 Projector Screen>

Of the projector screen 1, it goes without saying that a projector screen of various modes such as a white board, or white wall which can display the image from the projector 2, in addition to the general screen mode, can be used.

<4.4 Display>

Furthermore, the present invention can be applied to various kinds of displays which are capable of displaying the image, such as the crystal liquid display, plasma display, or projection television, in addition to the projector screen 1, and thus presentation with more variations can be realized.

DESCRIPTION OF CODES

Figure 1:
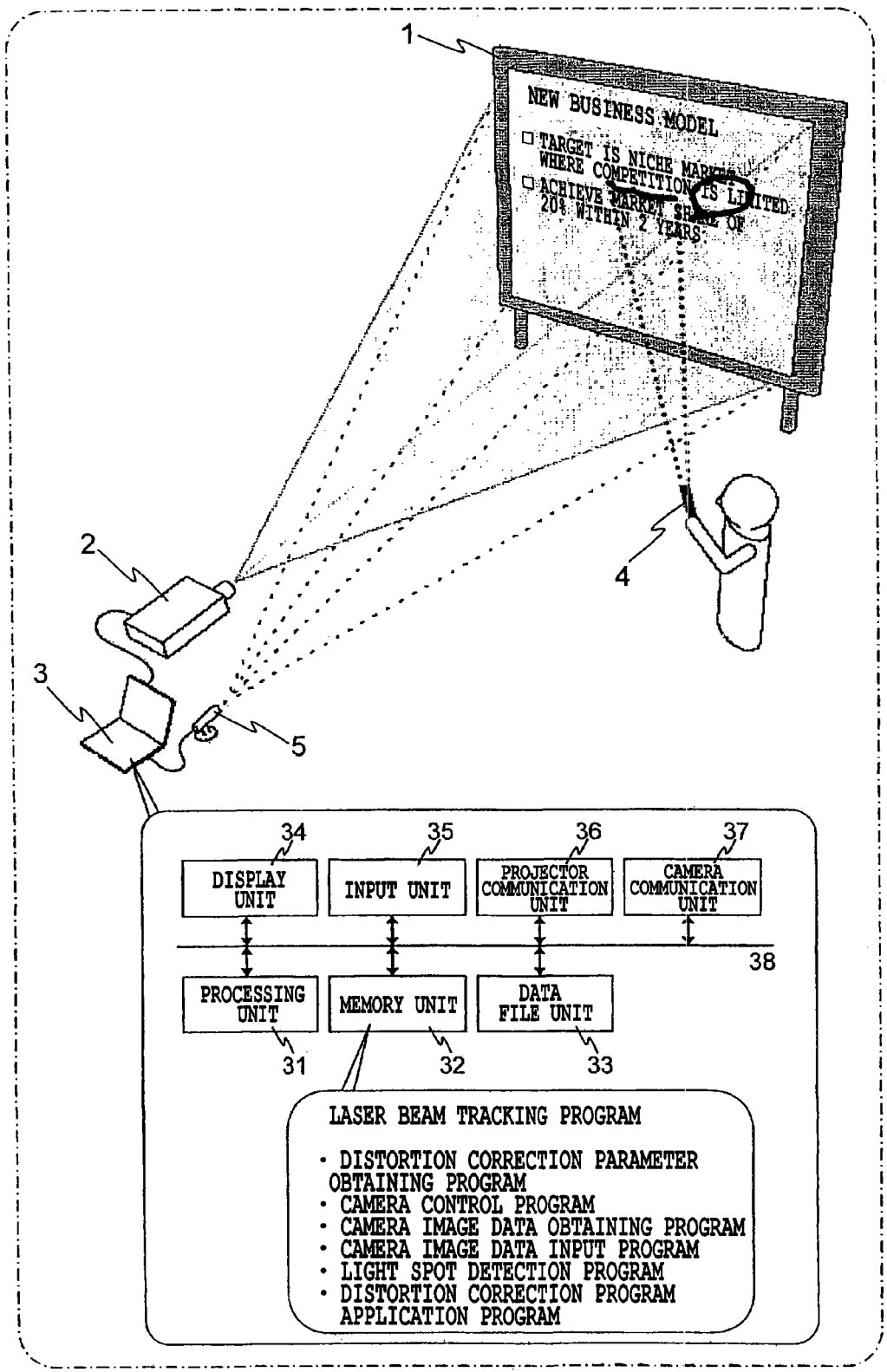
FIG. 1 is a schematic view explaining an embodiment of the present invention.
Figure 2:
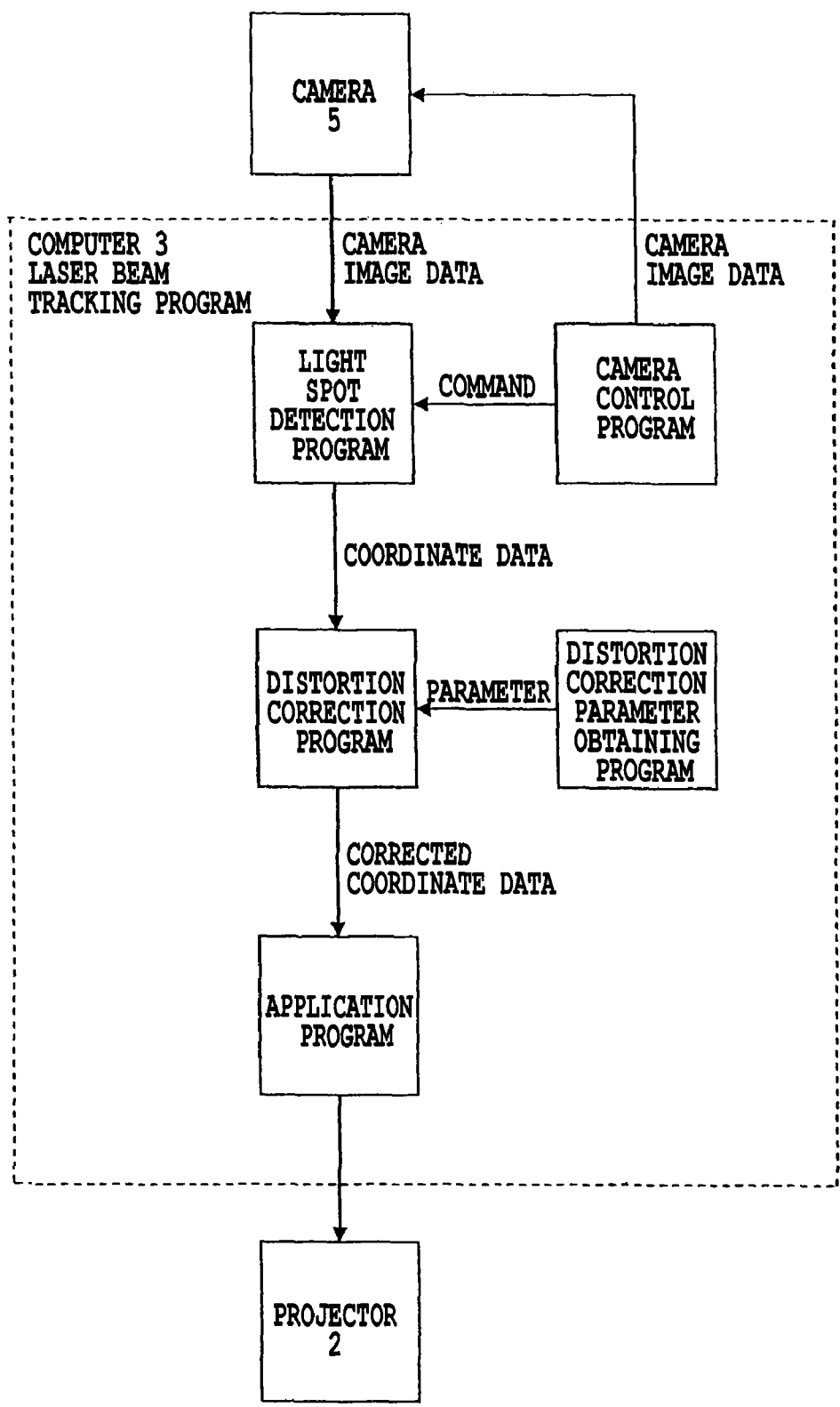
FIG. 2 is a program construction chart explaining an embodiment of the present invention.
Figure 3:
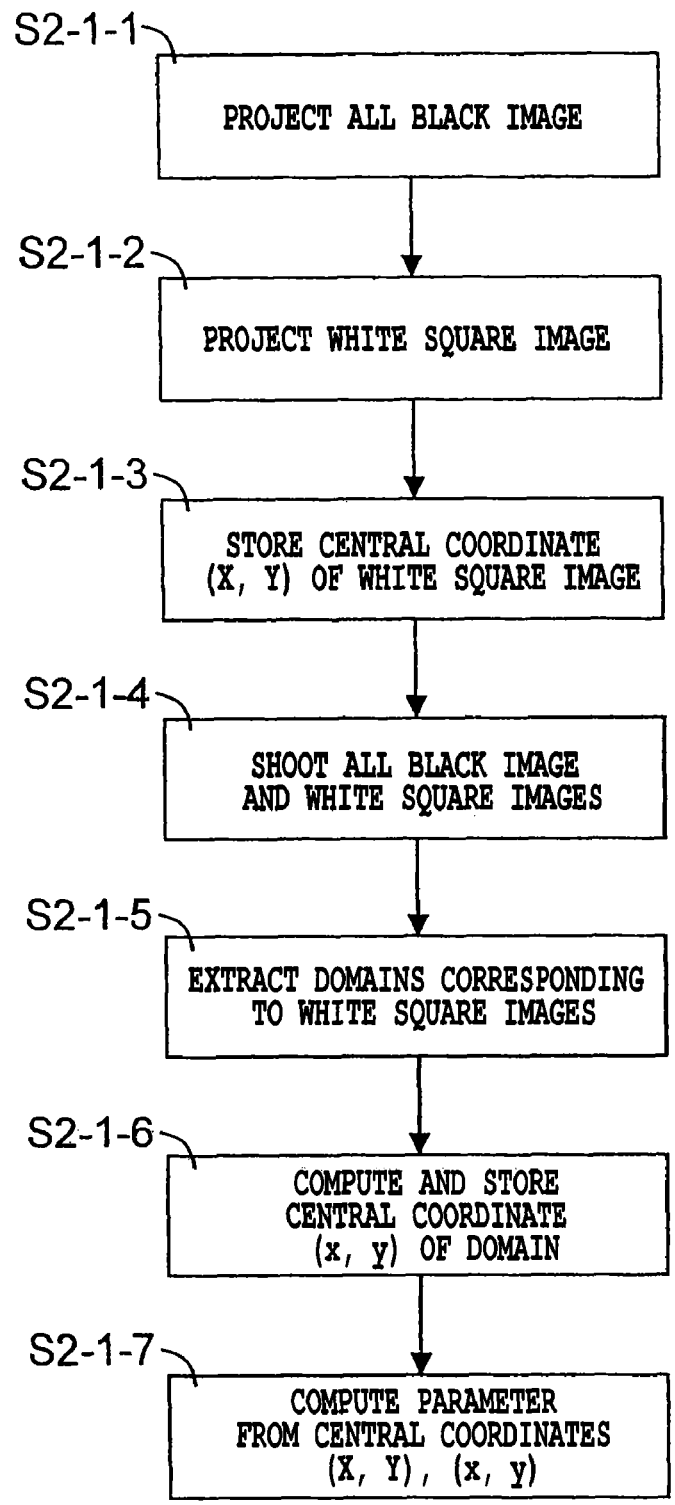
FIG. 3 is a flowchart explaining distortion correction parameter obtaining processing.
Figure 4:
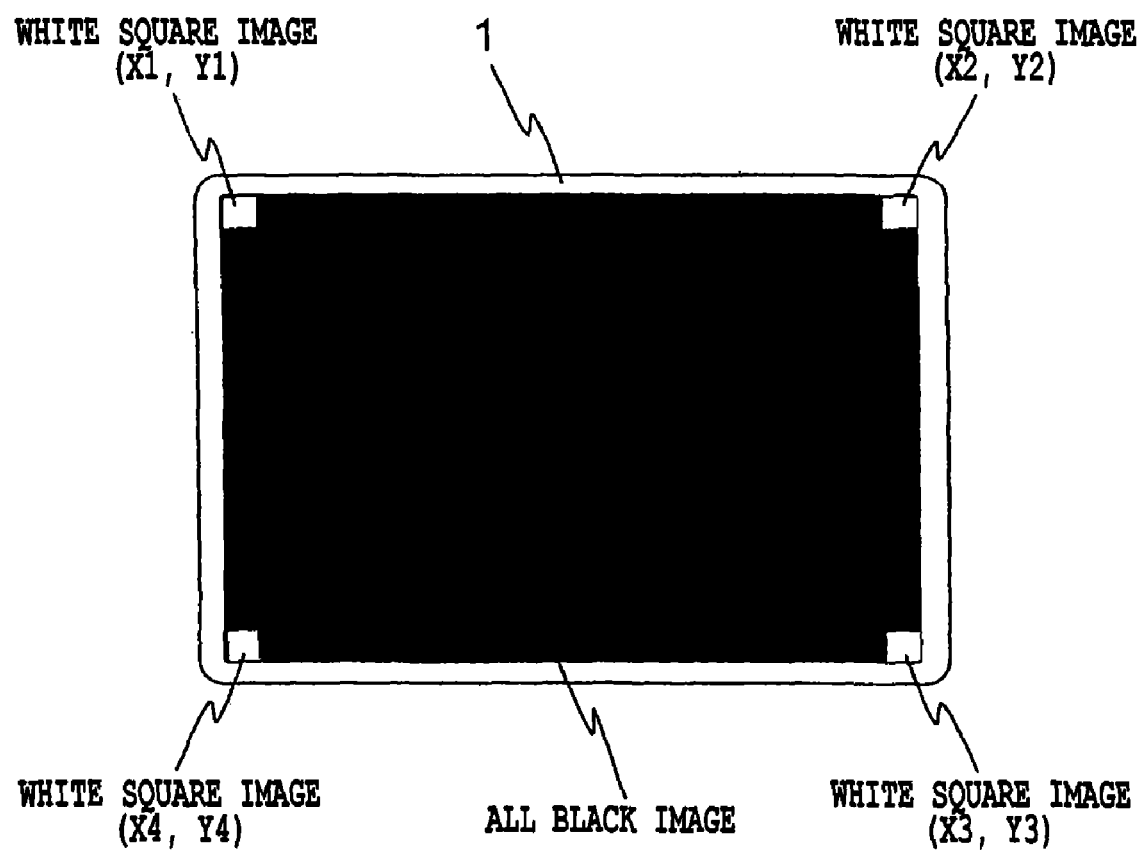
FIG. 4 is a view explaining distortion correction parameter obtaining processing.
Figure 5:
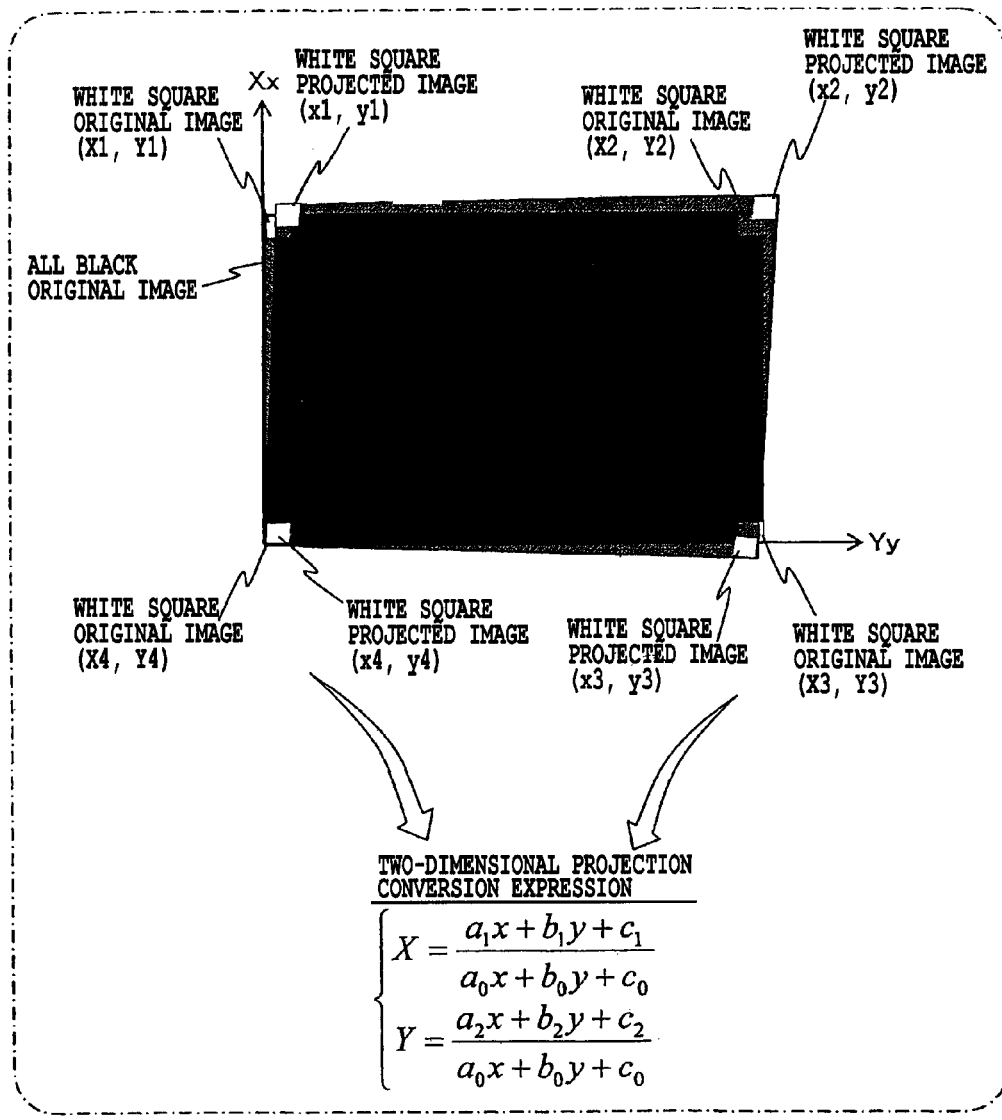
FIG. 5 is another view explaining distortion correction parameter obtaining processing.
Figure 6:
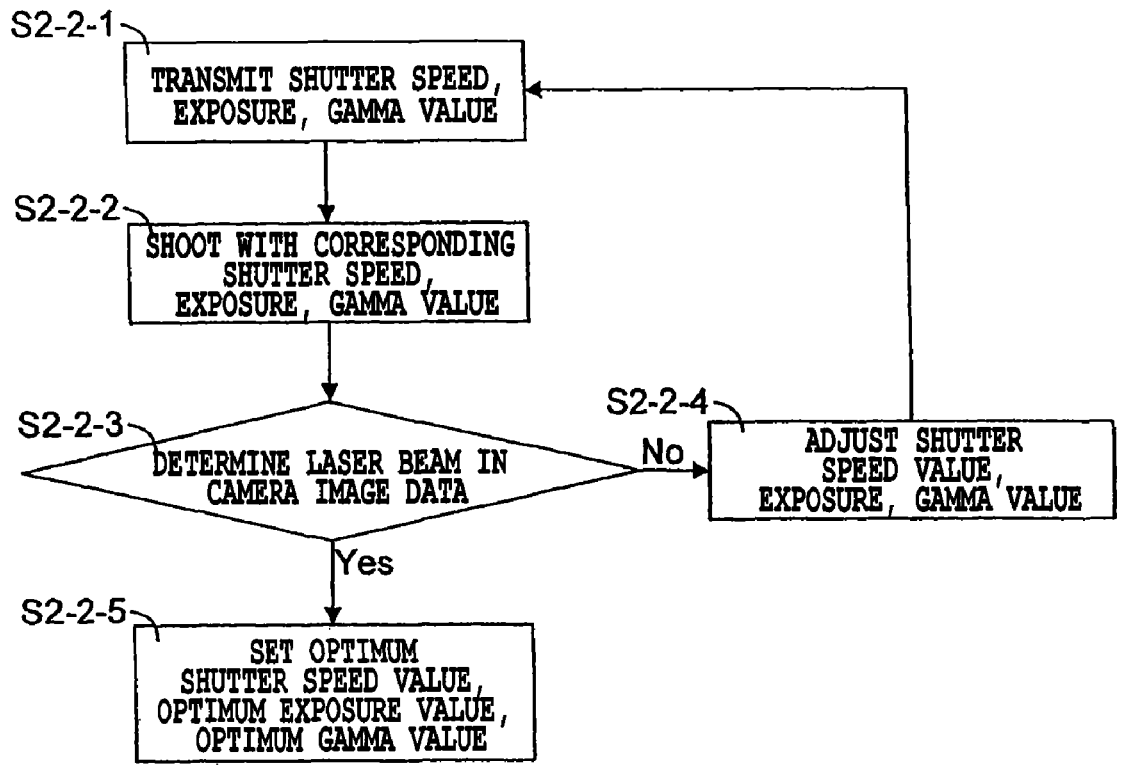
FIG. 6 is a flowchart explaining the processing for camera shutter speed, exposure and gamma value adjustment.
Figure 7:
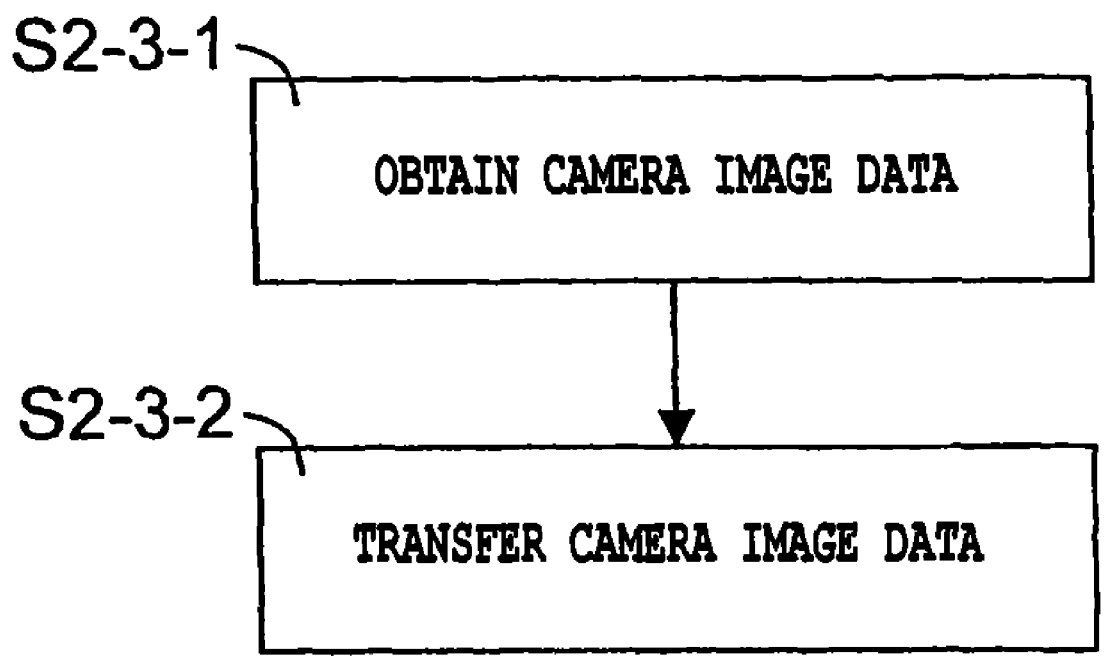
FIG. 7 is a flowchart explaining camera image obtaining processing.
Figure 8:
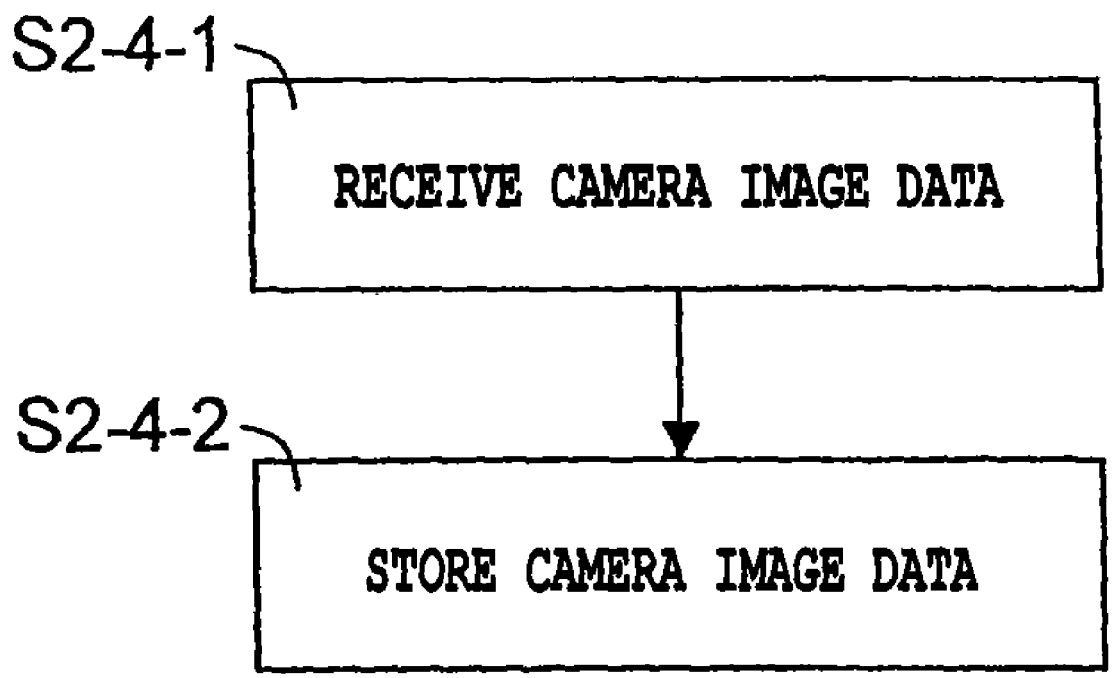
FIG. 8 is a flowchart explaining camera image input processing.
Figure 9:
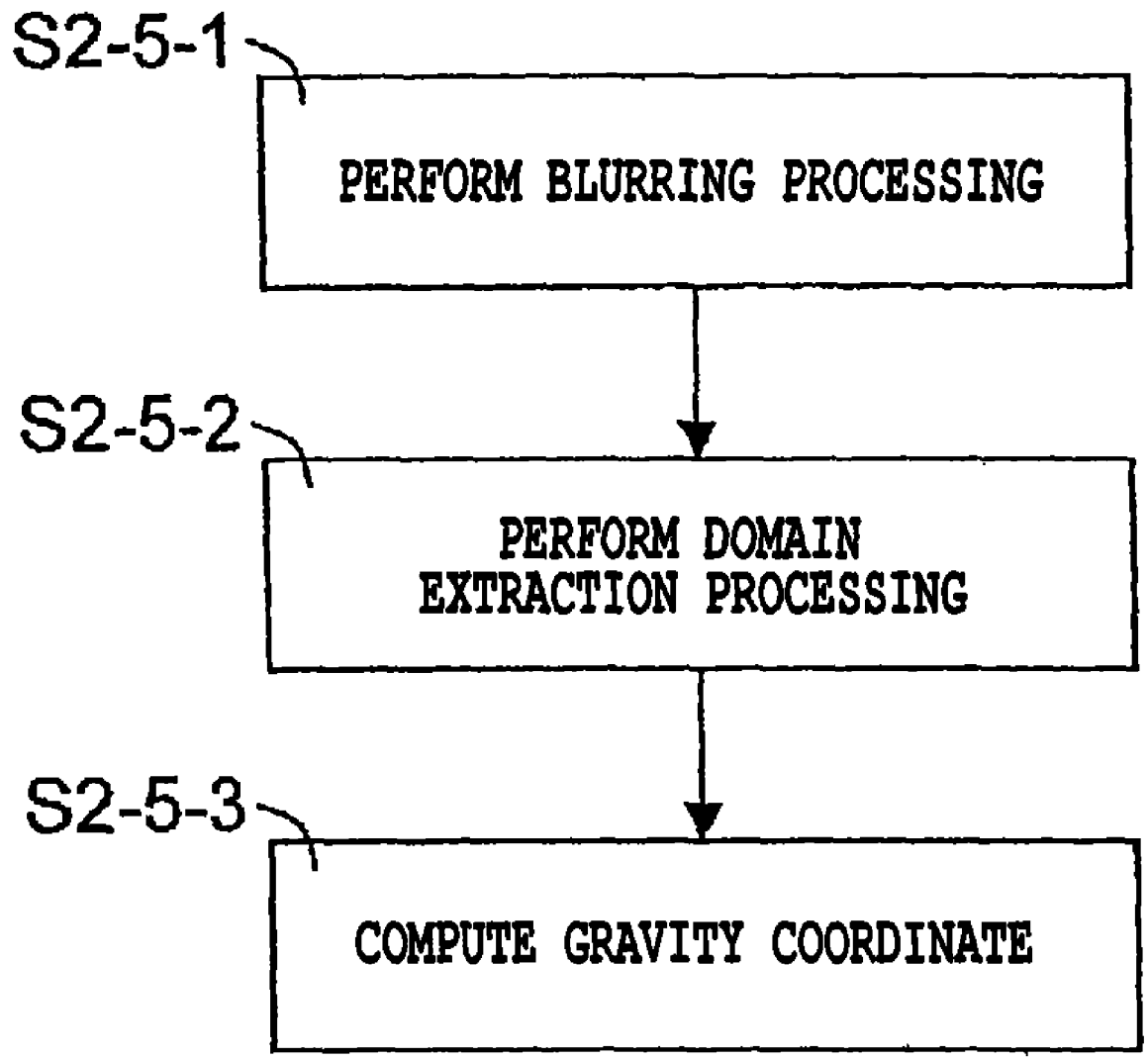
FIG. 9 is a flowchart explaining light spot detection processing.
Figure 10:
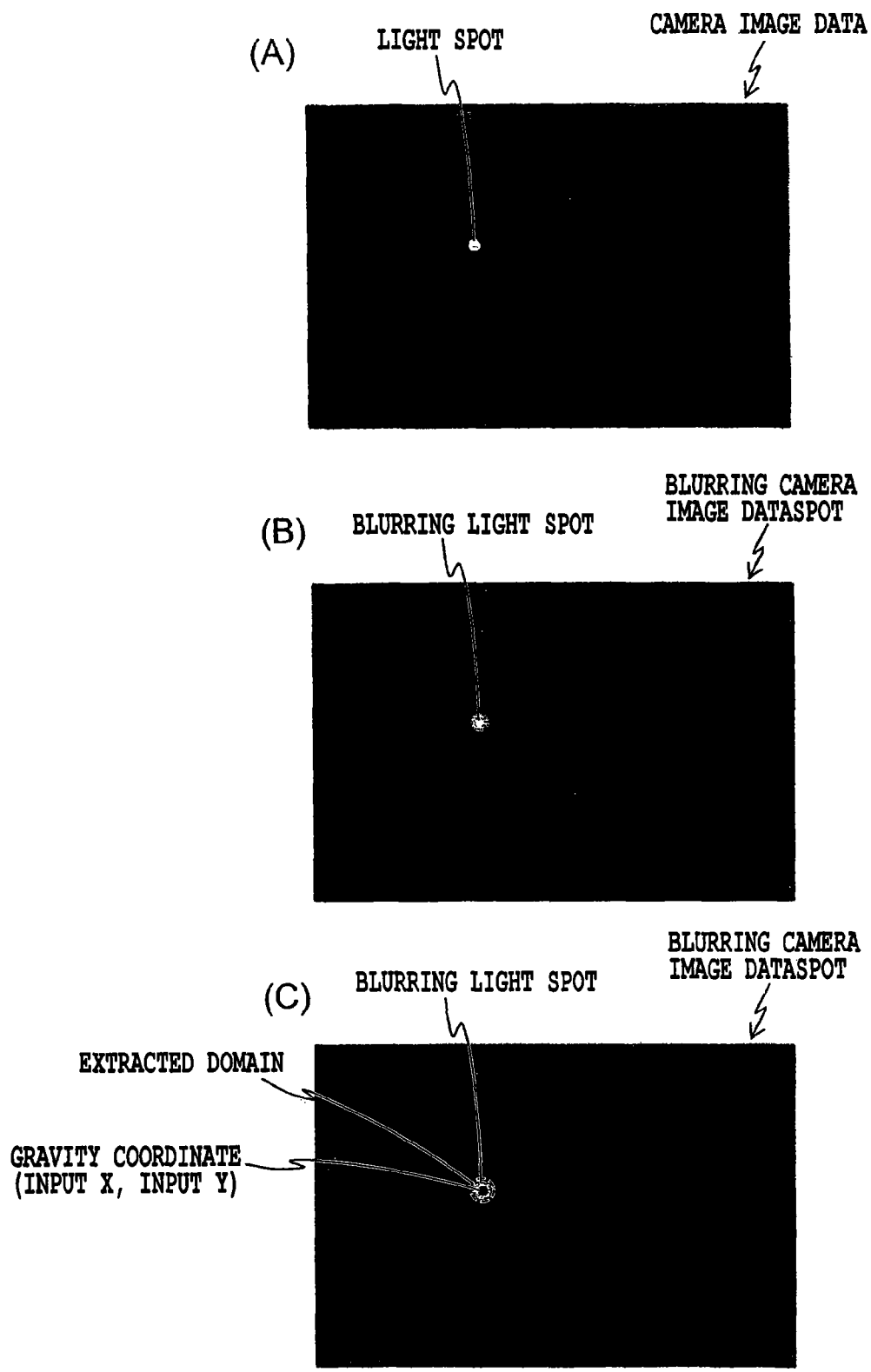
FIGS. 10(A), 10(B), 10(C) are respectively views explaining light spot detection processing.
Figure 11:
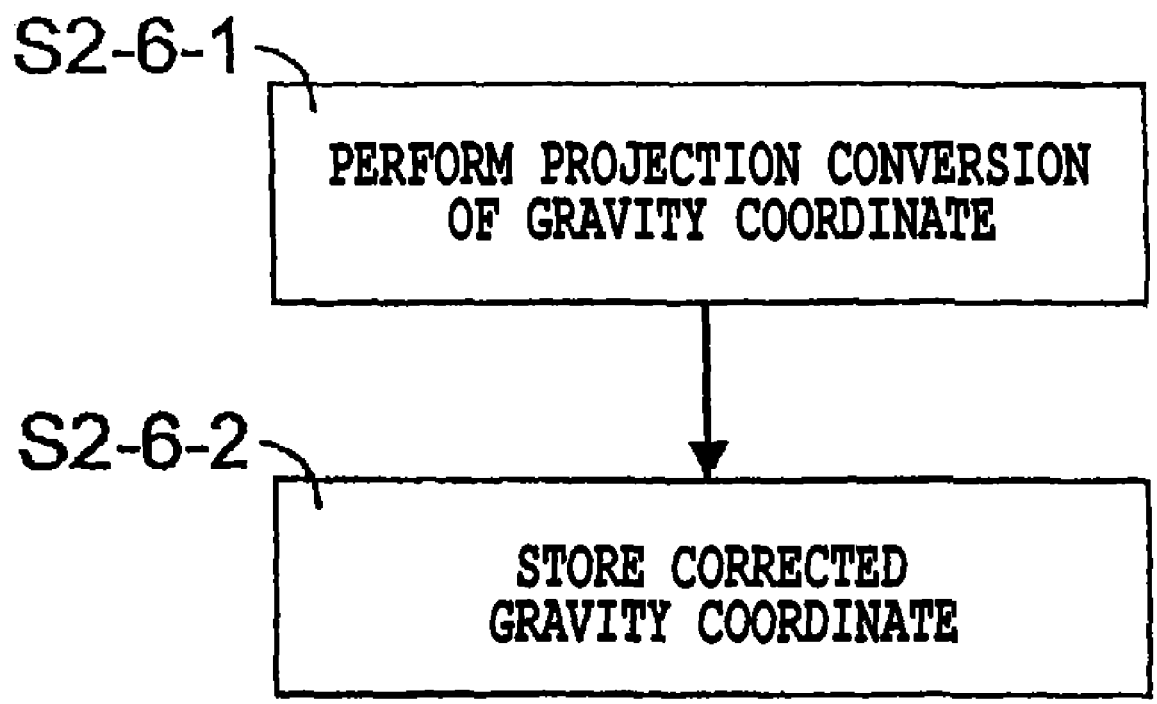
FIG. 11 is a flowchart explaining distortion correction processing.
Figure 12:
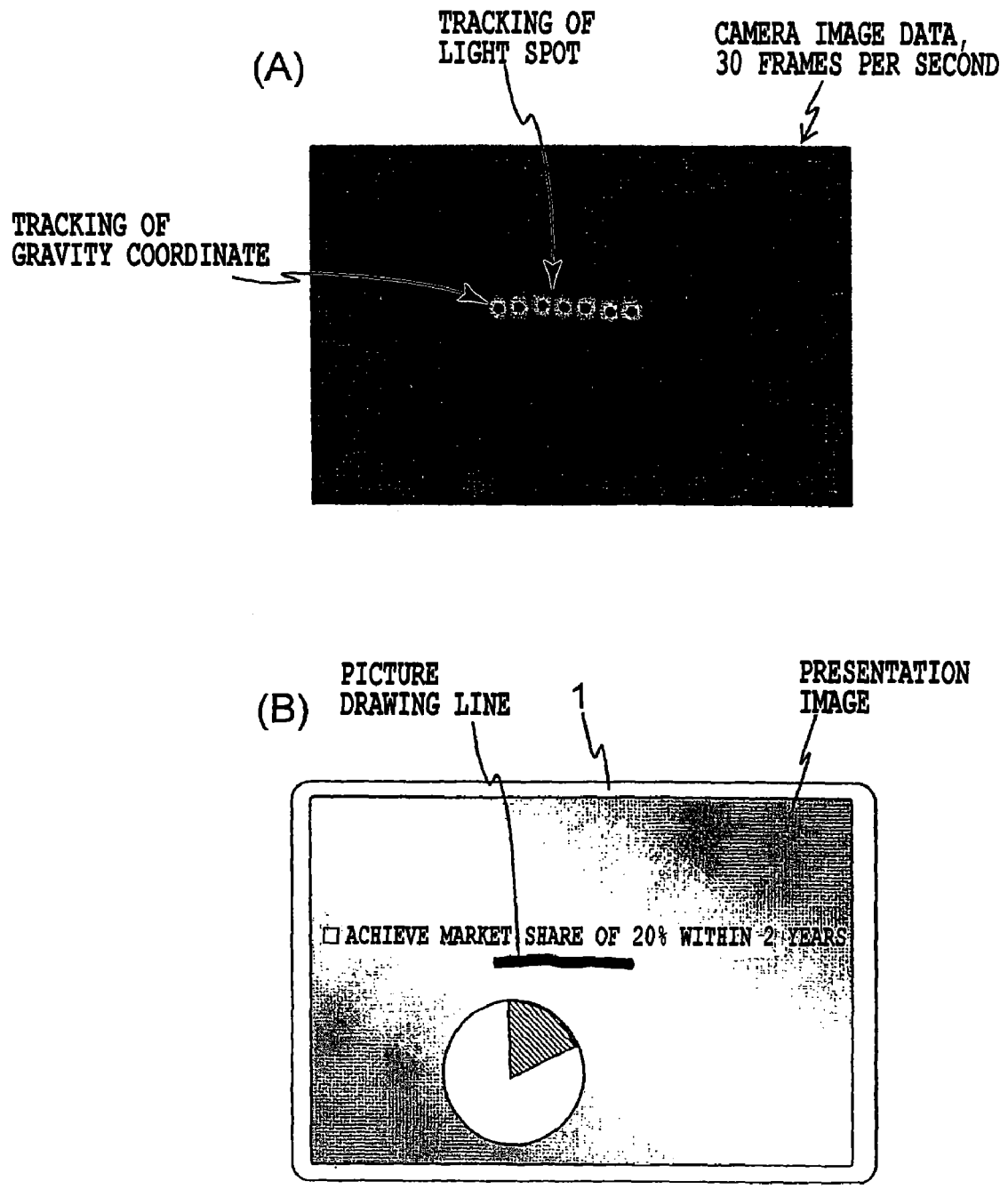
FIGS. 12(A), 12(B) are respectively views explaining distortion correction processing.
Figure 13:
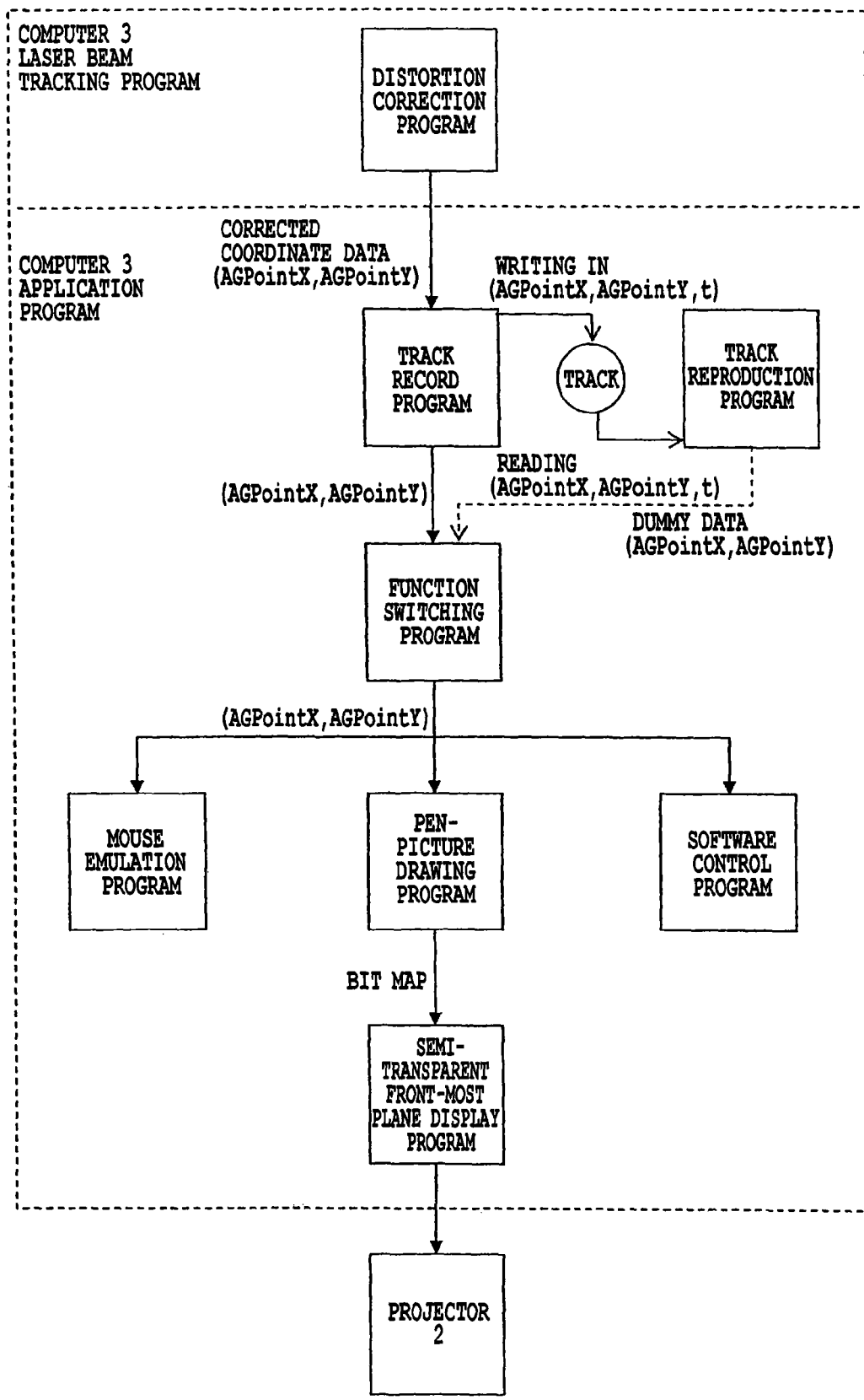
FIG. 13 is another program construction chart explaining an embodiment of the present invention.
Figure 14:
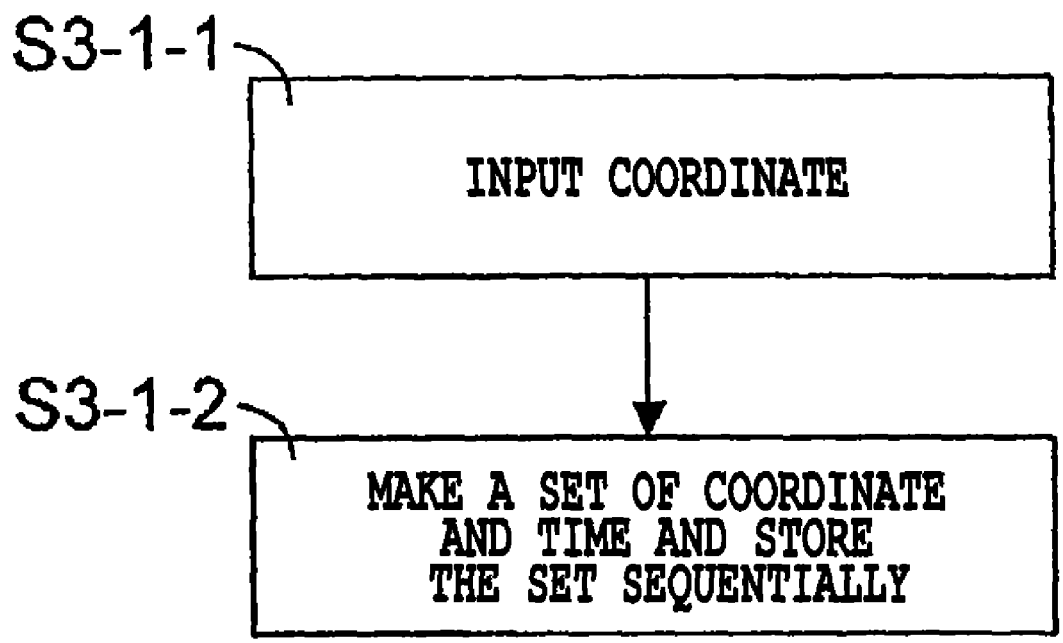
FIG. 14 is a flowchart explaining track record processing.
Figure 15:
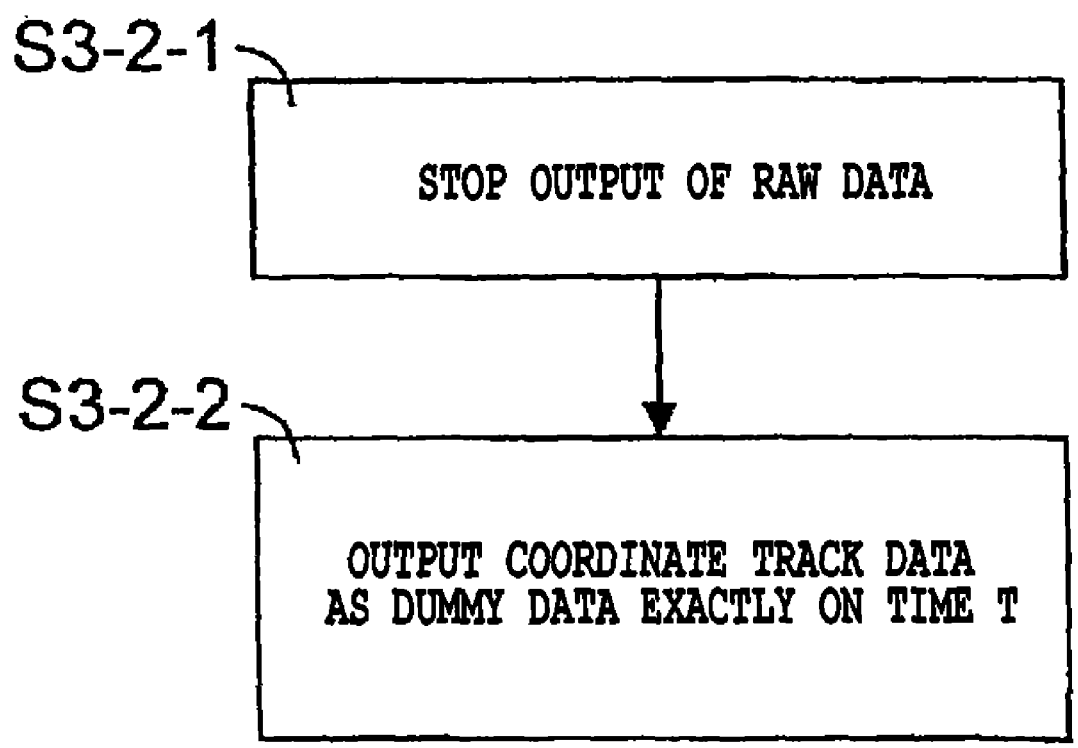
FIG. 15 is a flowchart explaining track reproduction processing.
Figure 16:
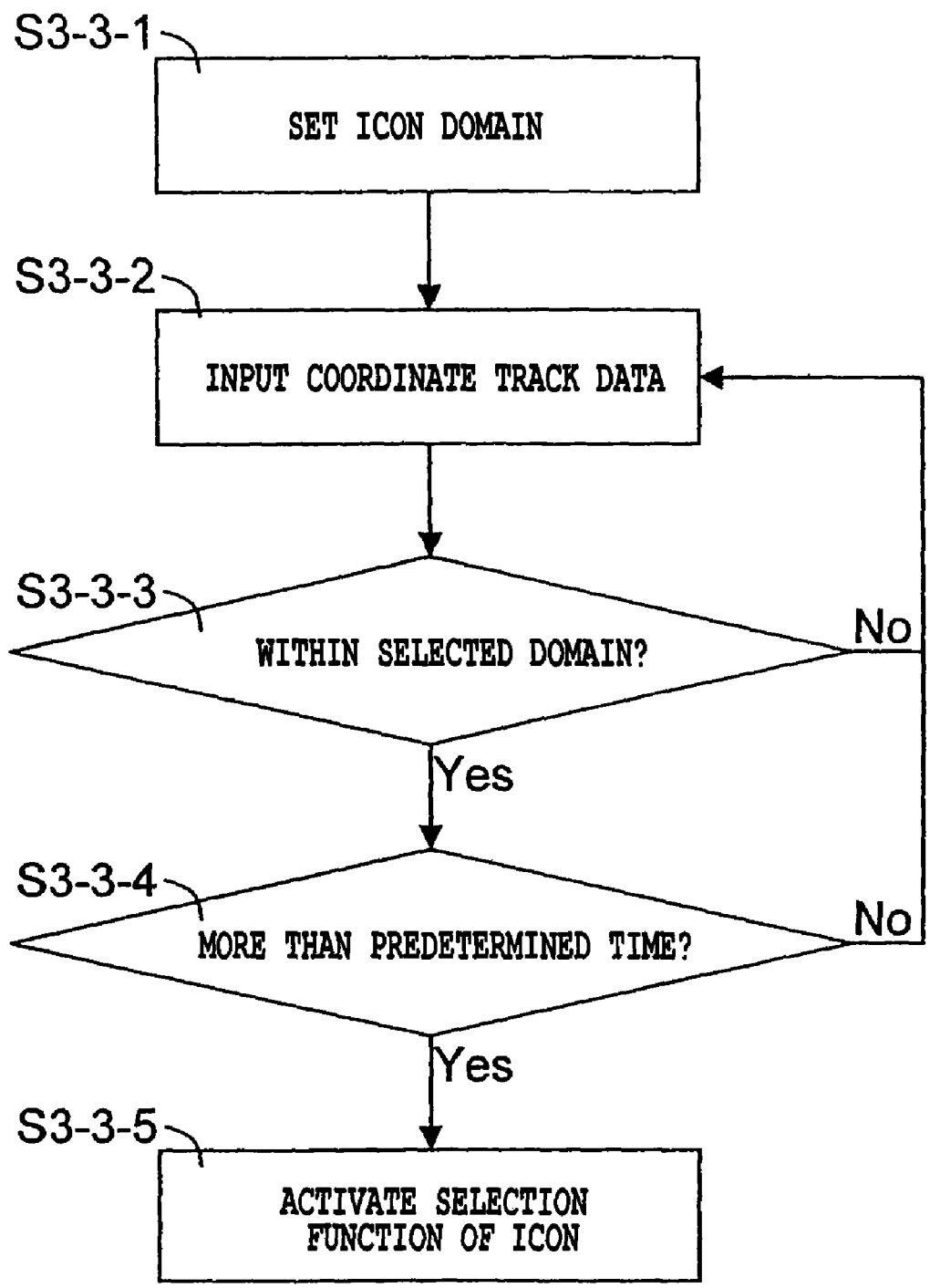
FIG. 16 is a flowchart explaining function switching processing.
Figure 17:
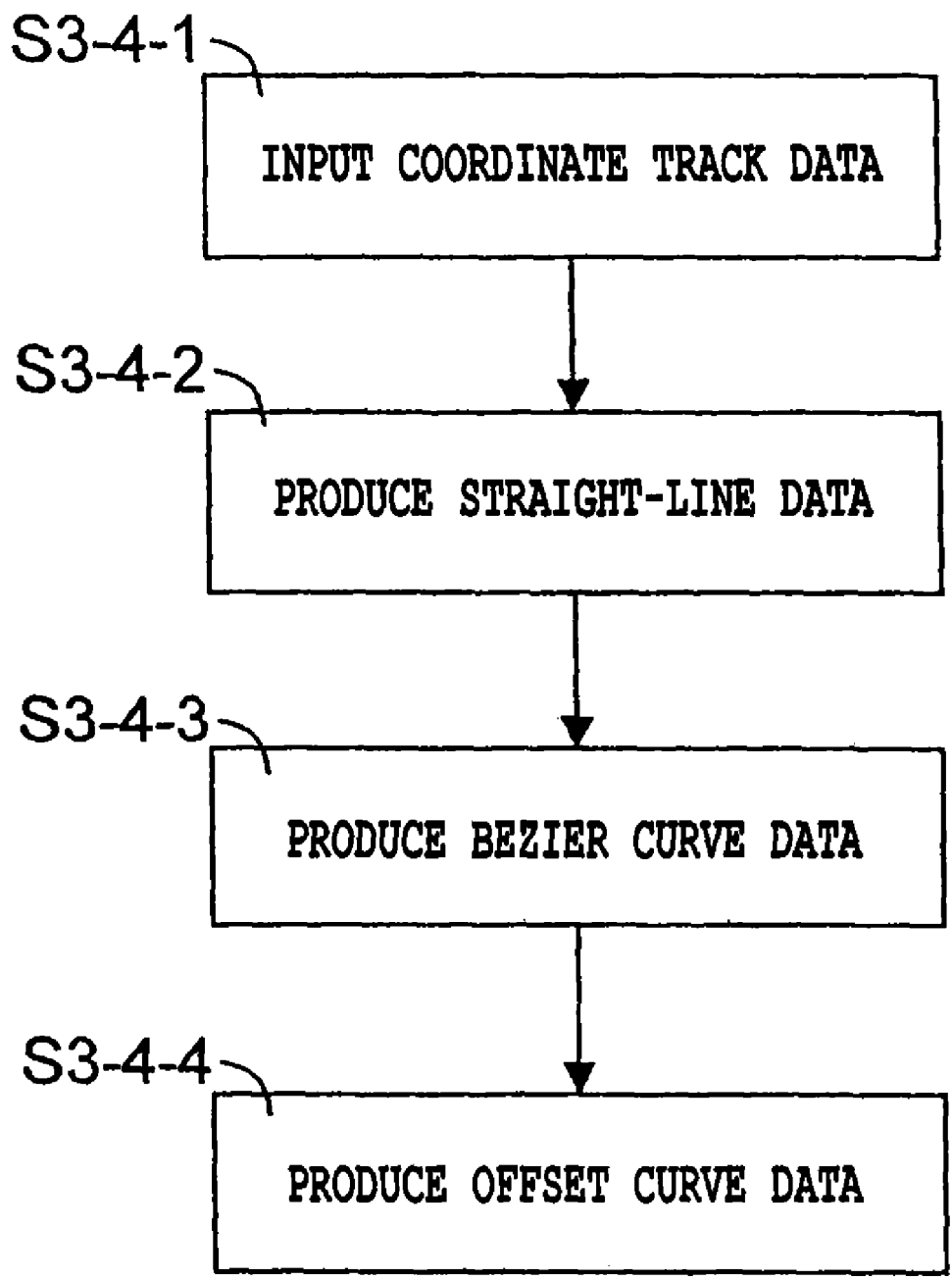
FIG. 17 is a flowchart explaining pen-picture drawing processing.
Figure 18:
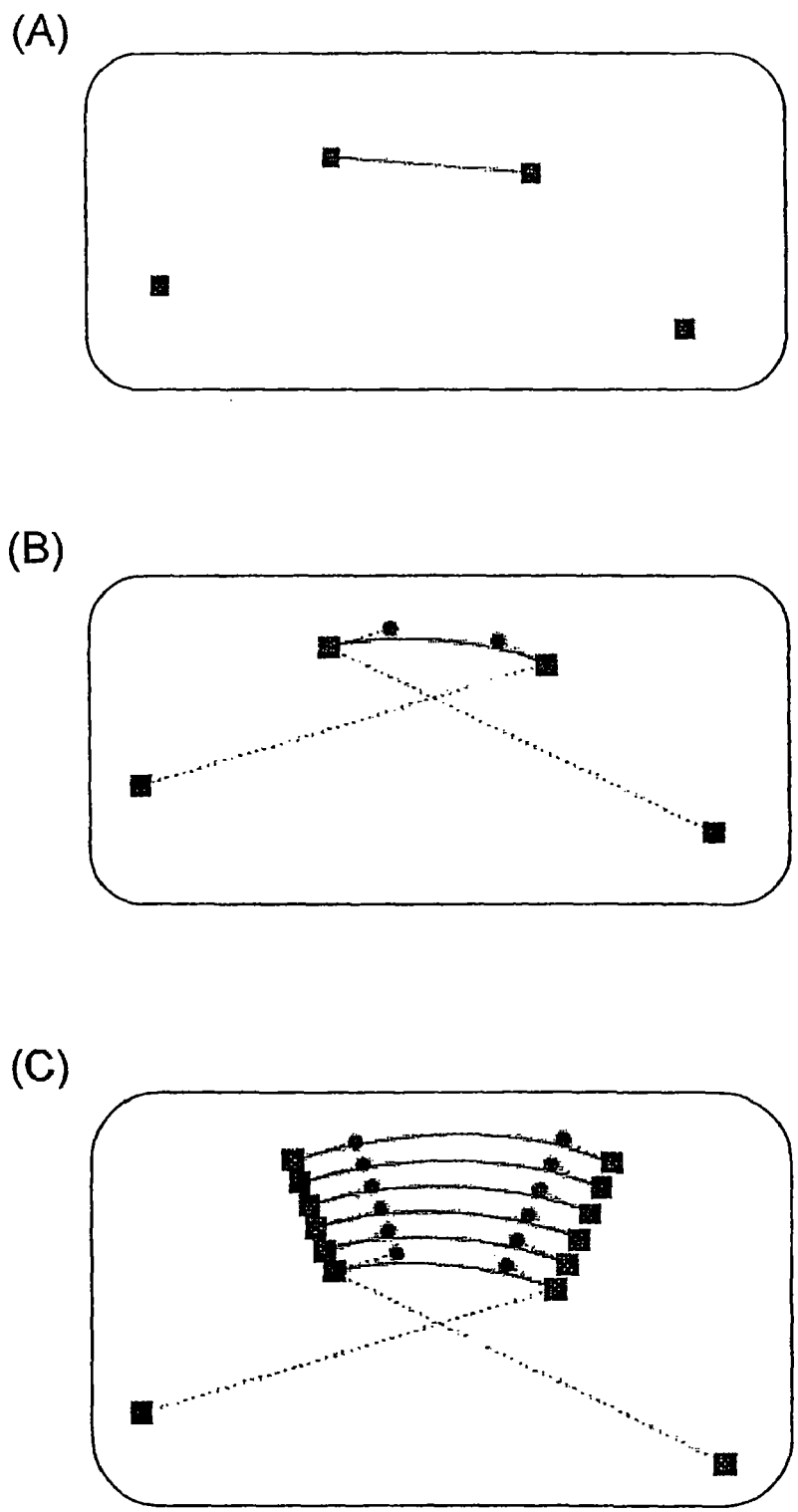
FIGS. 18(A), 18(B), 18(C) are respectively views explaining pen-picture drawing processing.
Figure 19:
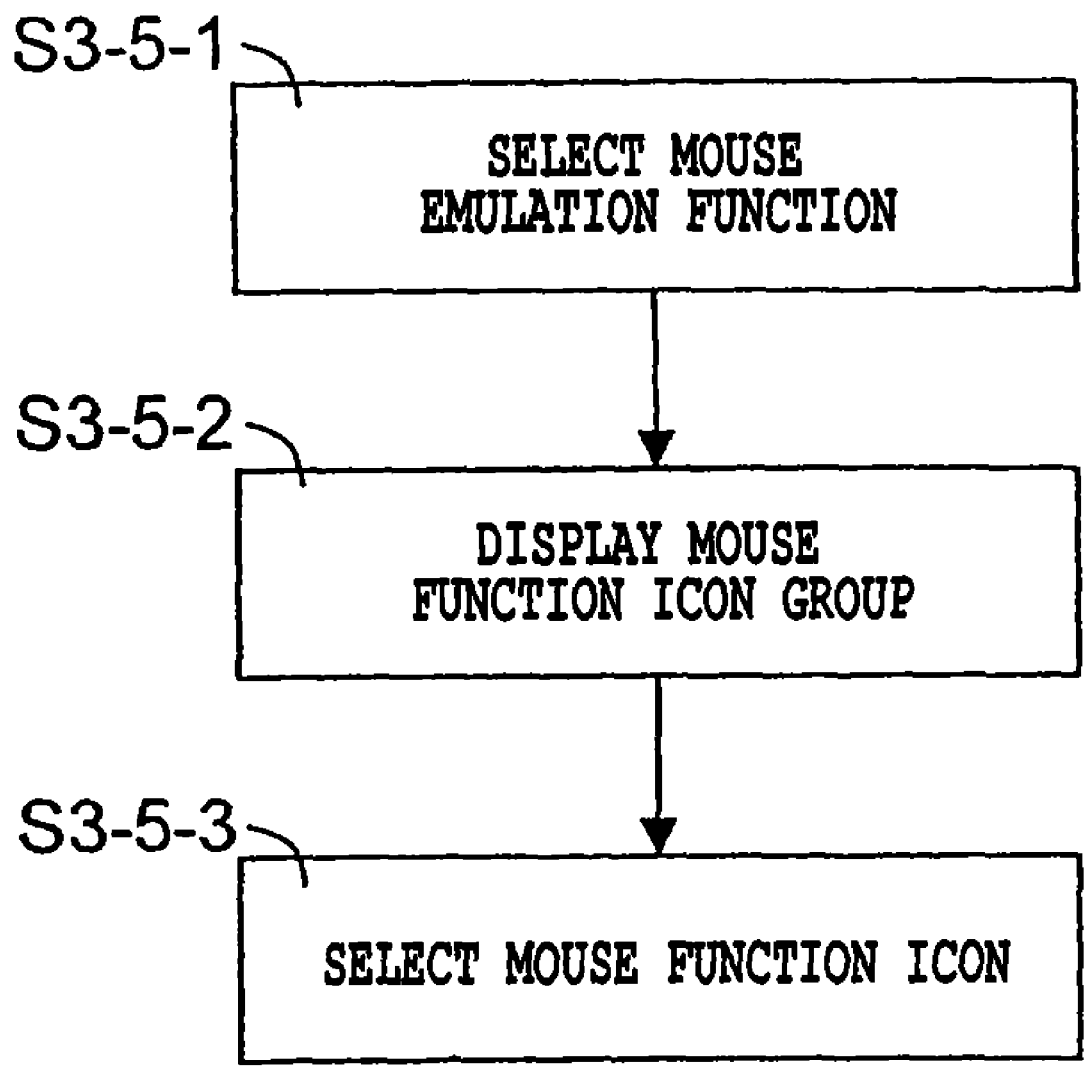
FIG. 19 is a flowchart explaining mouse emulation processing.
Figure 20:
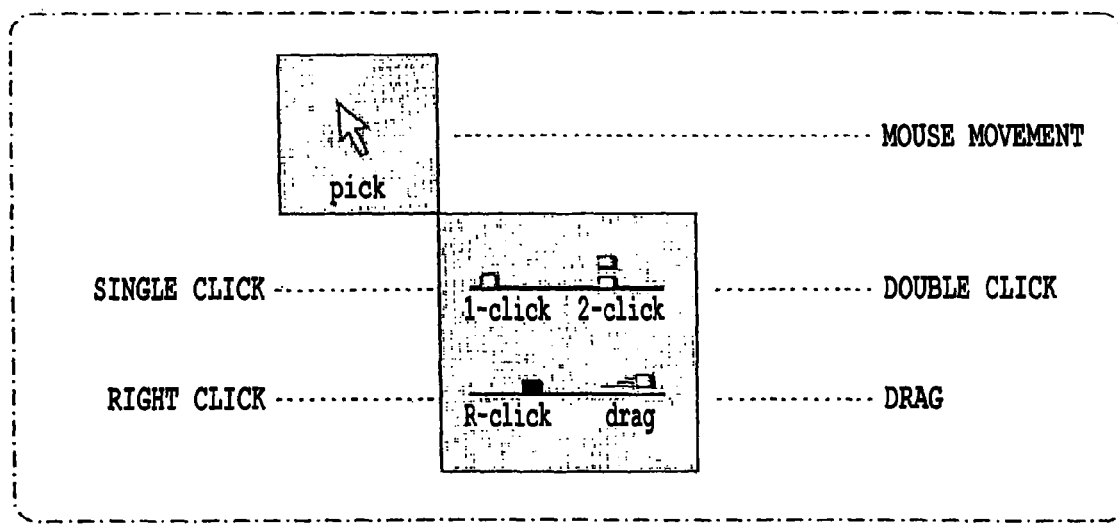
FIG. 20 is a view explaining mouse emulation processing.
Figure 21:
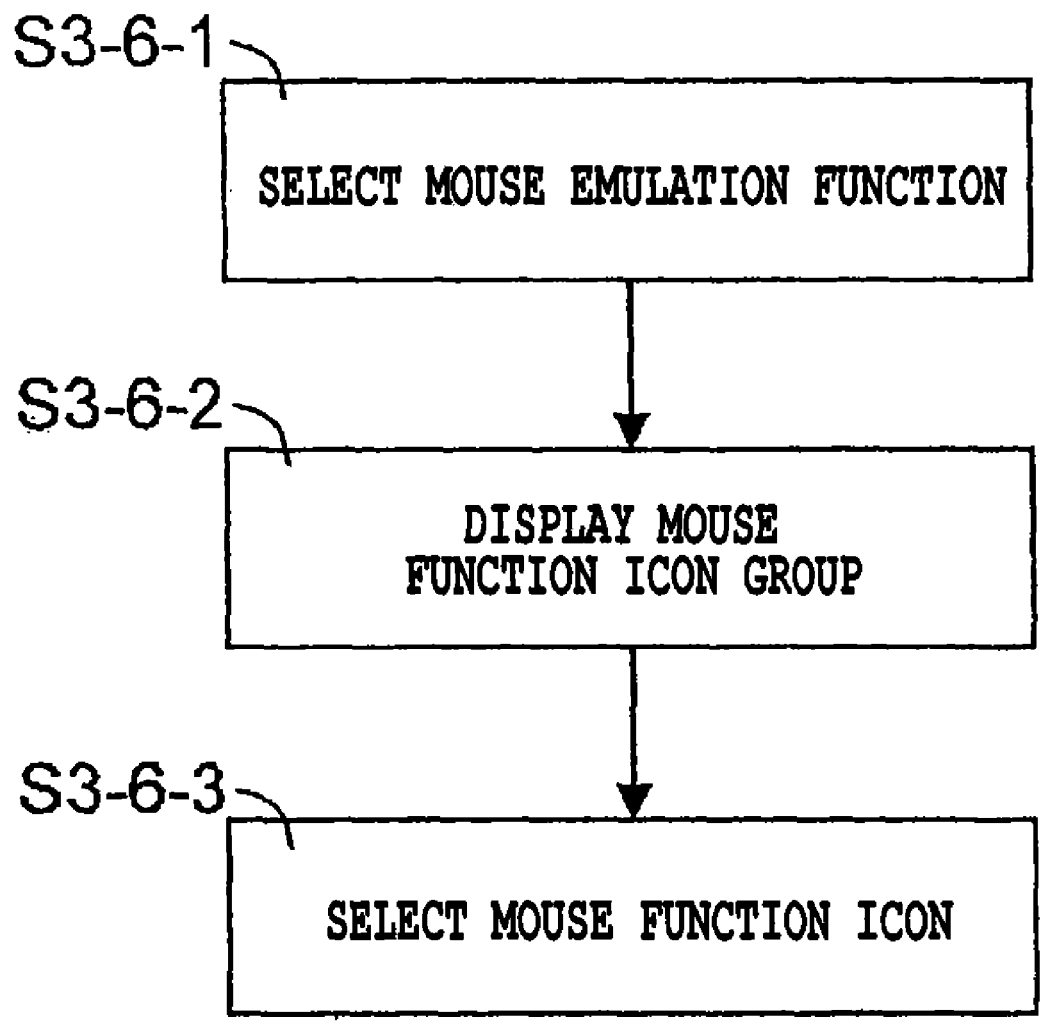
FIG. 21 is a flowchart explaining software control processing.
Figure 22:
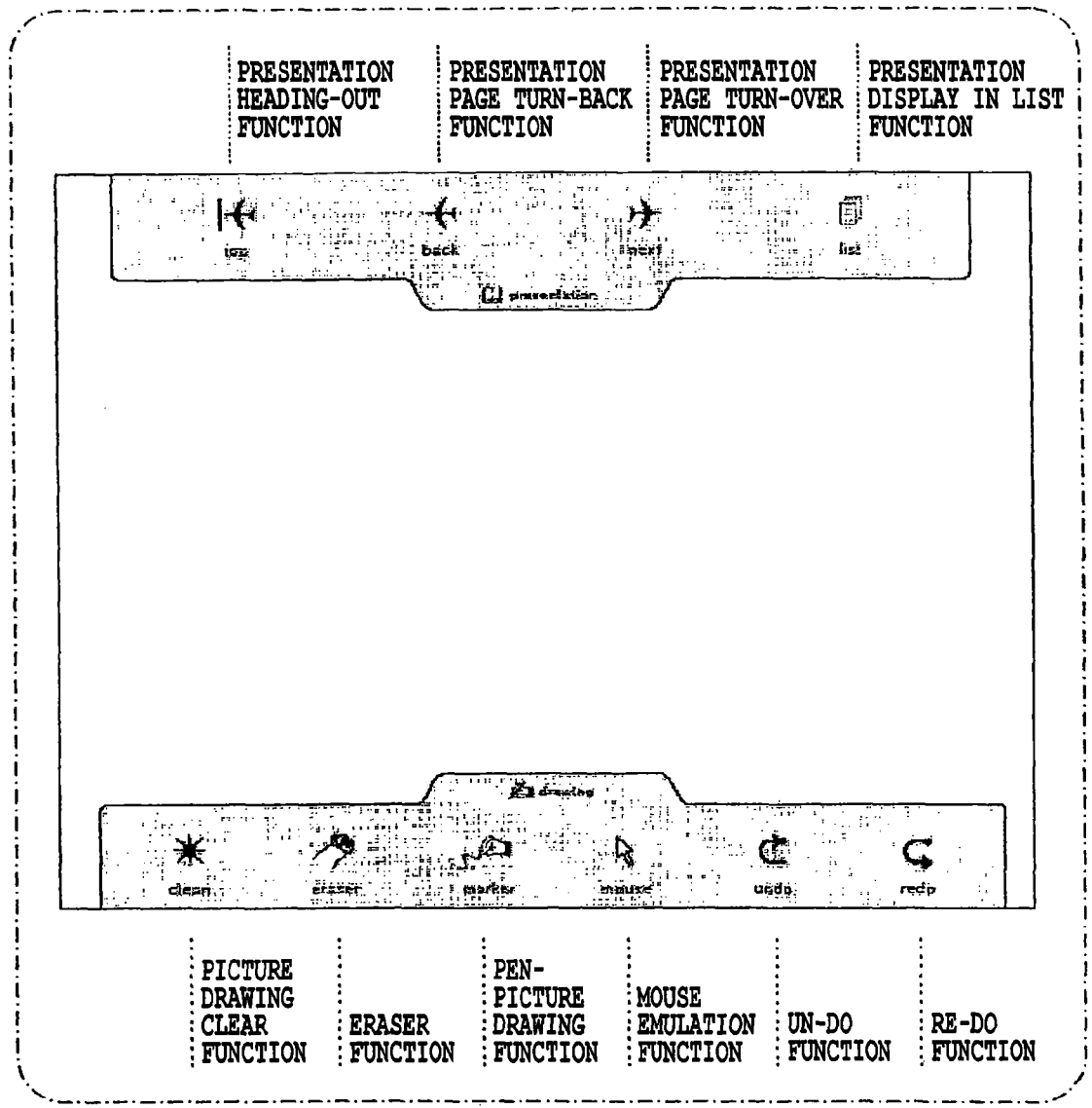
FIG. 22 is a view showing an example of a menu picture plane.

1. Projector Screen
2. Projector
3. Computer
31. Processing Unit
32. Memory Unit
33. Data File Unit
34. Display Unit
35. Input Unit
36. Projector Communication Unit
37. Camera Communication Unit
38. Bus
4. Laser Pointer
5. Camera

The invention claimed is:

1. A pointer light tracking method of shooting pointer light projected on a display with a camera to obtain image data and tracking the pointer light projected on the display with a computer based on the obtained image data, the method comprising the steps of:

projecting an all black image and white square images located at four corners of the all black image on the display;

storing central coordinates (X1, Y1)-(X4, Y4) of the four white square images;

shooting with the camera the display where the all black image and the four white square images are displayed;

extracting four domains corresponding to the four white square images from image data obtained from the camera;

computing central coordinates (x1, y1)-(x4, y4) of the extracted four domains;

computing parameters for performing distortion correction using projection conversion for a coordinate expressing a position of the pointer light on the display based on the computed central coordinates (x1, y1)-(x4, y4) and the central coordinates (X1, Y1)-(X4, Y4) of the four white square images;

shooting the display that displays only the pointer light and a presentation image;

adjusting at least one of a shutter speed, exposure, or gamma value of the camera shooting the display displaying both the pointer light and the presentation image to obtain pointer light image data where only the pointer light is strongly displayed.

2. The pointer light tracking method according to claim 1, further comprising the step of performing gradation processing for the obtained pointer light image data to enlarge a domain of light spot of the pointer light contained in the obtained pointer light image data.

3. A non-transitory computer-readable storage medium storing a pointer light tracking program executable by a computer for tracking pointer light projected on a display where an all black image and white square images located at four corners of the all black image are projected based on an image data obtained by shooting with a camera the pointer light projected on the display, the program comprising computer instructions for:

storing central coordinates (X1, Y1)-(X4, Y4) of the four white square images;

shooting with camera the display where the all black image and the four white square images located with the projected pointer light are displayed;

extracting four domains corresponding to the four white square images from the image data obtained from the camera;

computing central coordinates (x1, y1)-(x4, y4) of the extracted four domains;

computing a parameters for performing distortion correction using projection conversion for a coordinate expressing a position of the pointer light on the display based on the computed central coordinates (x1, y1)-(x4, y4) and the central coordinates (X1, Y1)-(X4, Y4) of the four white square images;

shooting the display that displays only the pointer light and a presentation image;

adjusting at least one of a shutter speed, exposure, or gamma value of the camera shooting the display displaying both the pointer light and the presentation image to obtain pointer light image data where only the pointer light is strongly displayed.

4. The non-transitory computer-readable storage medium according to claim 3, wherein the program further comprises computer instructions for performing gradation processing for the obtained pointer light image data to enlarge a domain of light spot of the pointer light contained in the obtained pointer light image data.

* * * * *